United States Patent [19]

Ozaki

[11] Patent Number: 5,797,296
[45] Date of Patent: Aug. 25, 1998

[54] BICYCLE SPEED CHANGE OPERATION ASSEMBLY

[75] Inventor: Nobuo Ozaki, Osaka, Japan

[73] Assignee: Sugino Cycle Industries, Ltd., Nara, Japan

[21] Appl. No.: 737,352

[22] PCT Filed: Mar. 29, 1996

[86] PCT No.: PCT/JP96/00907

§ 371 Date: Nov. 1, 1996

§ 102(e) Date: Nov. 1, 1996

[87] PCT Pub. No.: WO96/30250

PCT Pub. Date: Oct. 3, 1996

[30] Foreign Application Priority Data

Mar. 31, 1995 [JP] Japan ............... 7-100491
Jul. 27, 1995 [JP] Japan ............... 7-212807

[51] Int. Cl.⁶ .................................. B62K 23/04
[52] U.S. Cl. ............. 74/489; 74/473.14; 74/488; 74/489; 74/502.2
[58] Field of Search ............. 74/475, 502.2, 74/489, 473.14

[56] References Cited

U.S. PATENT DOCUMENTS

| | | | |
|---|---|---|---|
| 4,201,095 | 5/1980 | Cirami | 74/489 X |
| 4,232,565 | 11/1980 | Leonheart | |
| 4,267,744 | 5/1981 | Yamasaki | 74/475 |
| 4,279,174 | 7/1981 | Ross | 74/475 X |
| 4,653,613 | 3/1987 | Blancas | 74/489 X |
| 4,699,018 | 10/1987 | Tagawa | 74/475 |
| 4,771,649 | 9/1988 | Modolo | 74/489 |
| 4,876,913 | 10/1989 | Romano | 74/489 X |
| 4,966,046 | 10/1990 | Tagawa | 74/502.2 |
| 5,102,372 | 4/1992 | Patterson et al. | |
| 5,315,891 | 5/1994 | Tagawa | 74/489 |
| 5,437,206 | 8/1995 | Boor | 74/489 |

FOREIGN PATENT DOCUMENTS

| | | | |
|---|---|---|---|
| 0 635 422 | 1/1995 | European Pat. Off. | |
| 1088089 | 3/1955 | France | 74/489 |
| 03-176290 | 7/1991 | Japan | |
| 06-51096 | 7/1994 | Japan | |
| 06-239287 | 8/1994 | Japan | |
| 2024381 | 1/1980 | United Kingdom | 74/475 |
| WO 96/04167 | 2/1996 | WIPO | |

Primary Examiner—Rodney H. Bonck
Assistant Examiner—Scott Lund
Attorney, Agent, or Firm—Merchant, Gould, Smith, Edell, Welter & Schmidt

[57] ABSTRACT

A bicycle speed change operation assembly (A) of the present invention has a rotatable operation member (2) and is connected to a speed change device of the bicycle via a control cable (C), wherein the assembly includes a first link (3) and a second link (4). An end (3b) of the first link (3) and an end (4b) of the second link are connected for relative pivotal movement. The other end (3a) of the first link 3 is supported so as to be moved circumferentially of the operation member (2) upon rotation thereof. The other end (4a) of the second link (4) is pivotally supported at a fixed point, and an end of the control cable (C) is connected to the second link (4).

18 Claims, 38 Drawing Sheets

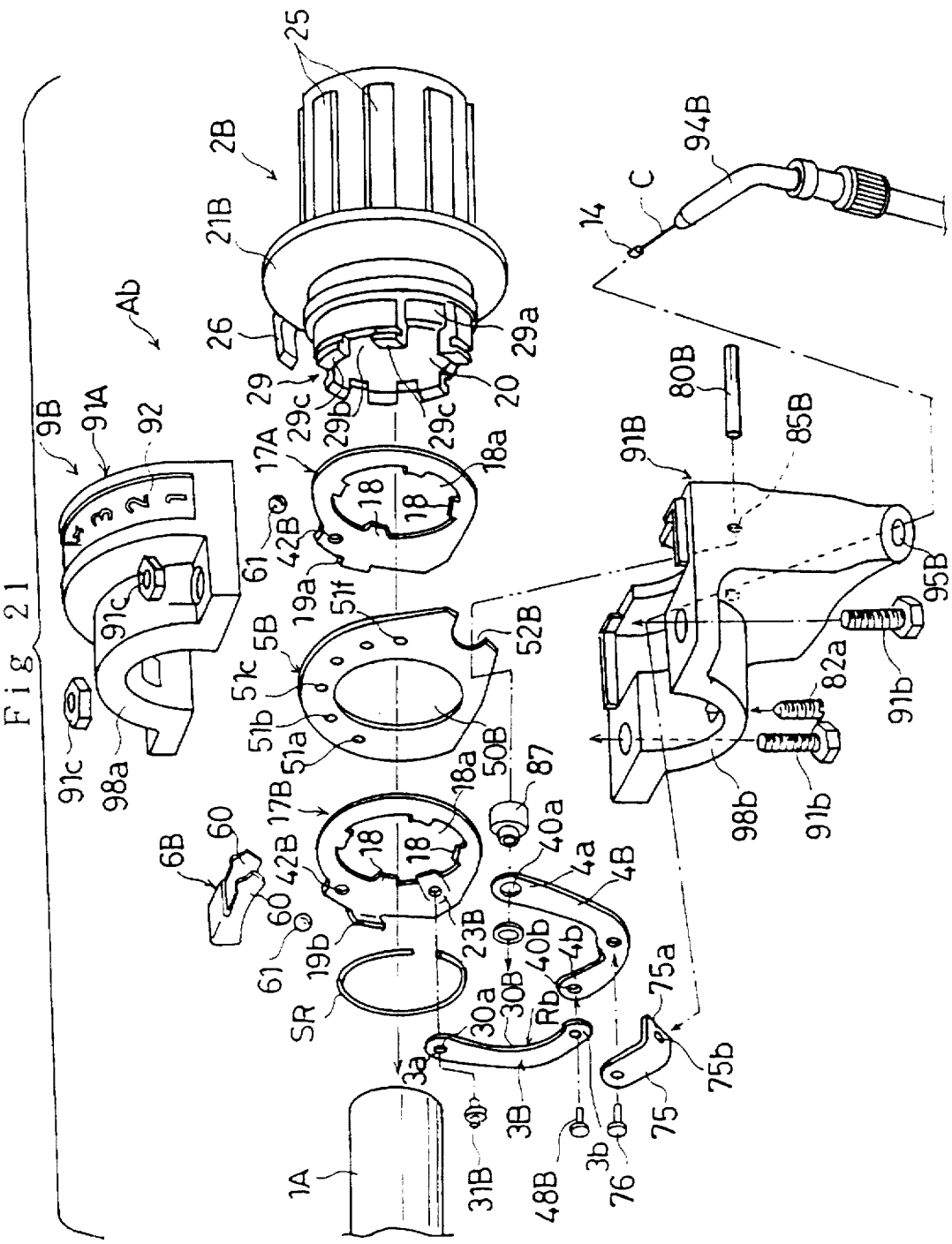

5,797,296

1

BICYCLE SPEED CHANGE OPERATION ASSEMBLY

This application is a U.S. National Stage filing of PCT/JP96/00907 filed Mar. 29, 1996 and claiming priority from Japanese Application Nos. 7-100491 and 7-212807, filed Mar. 31, 1995 and Jul. 27, 1995, respectively.

TECHNICAL FIELD

The present invention relates to a bicycle speed change operation assembly used for remotely operating a bicycle speed change device such as a rear derailleur, a front derailleur and the like via a control cable.

BACKGROUND ART

An example of conventional bicycle speed change operation assemblies of the above type is disclosed in U.S. Pat. No. 5,102,372. The bicycle speed change operation assembly of the patent includes an operation member 3e mounted around a handlebar 1E of the bicycle for rotational movement and a cam plate 130 attached to the outer surface of the operation member 3e, as shown in FIG. 41a of the application. The outer surface of the cam plate 130 is brought into contact with a control cable C2 connected to a speed change device of the bicycle. The control cable C2 has a nipple 14 attached to a suitable portion of a housing case 131.

With such a bicycle speed change operation assembly, upon rotation of the cam plate 130 in the direction of arrow N30 by rotating the operation member 3e, the length of the outer surface portion of the cam plate 130 coming into contact with the control cable C2 increases from Sc to Sd as shown in FIG. 41b. Thus, the control cable C2 can be pulled by the cam plate 130 in the direction of arrow N30 by an amount of (Sd–Sc). Further, the actual pulled length (Sd–Sc) of the control cable C2 can be smaller than the rotational displacement of the operation member 3e. Thus, according to the above bicycle speed change operation assembly, the operation cable C2 can be pulled by small pitches upon rotation of the operation member 3e by rather large rotational angles.

Where a large amount of the control cable C2 is pulled due to a small amount of rotational angle of the operation member 3e, even if the cyclist slightly rotates the operation member 3e, the speed change device is inadvertently caused to perform a speed change operation. Further, when causing the speed change device to shift from the first speed level to the second speed level for example, an operational error is likely to occur with a result that the shifting is performed to the third speed level due to too much rotation of the operation member 3e. On the other hand, the bicycle speed change operation assembly described above can overcome such an inconvenience.

However, the conventional assembly described above is not arranged to directly pull the control cable C2 by the rotational operation of the operation member 3e but designed to pull the control cable C2 forcefully along the outer circumferential surface of the cam plate 130 in contact with the control cable C2.

Further, the speed change device always exerts a spring force on the control cable C2, thereby constantly giving the control cable C2 a tension T toward the speed change device. Thus, rather large frictional resistance will act on the control cable C2 for pulling the control cable C2 by the rotational operation of the cam plate 130.

Thus, conventionally, a large rotational operation torque is needed to pull the control cable C2 for rotating the operation member 3e. In the above conventional bicycle speed change operation assembly, the actual pulling amount for the control cable C2 is rendered small for the rotational angle of the operation member 3e. Therefore, theoretically, the rotational operation torque for the operation member 3e should be small due to the function of a force-magnifying mechanism. However, in reality, it is disadvantageously difficult to handle the operation member 3e due to the frictional resistance between the control cable C2 and the cam plate 130. Especially, after the conventional assembly has been used for a long period, the outer circumferential surface of the cam plate 130 will be formed with a groove due to the frictional contact with the control cable C2. As a result, the control cable C2 is fitted into the groove, thereby making it more difficult to handle the operation member 3e.

DISCLOSURE OF THE INVENTION

An object of the present invention is to make it possible to cause the control cable to be slightly displaced by a large rotational angle of the operation member of the bicycle speed change operation assembly without deteriorating the handling performance of the bicycle speed change operation assembly.

According to the present invention, there is provided a bicycle speed change operation assembly which has a rotatable operation member and is connected to a speed change device of the bicycle via a control cable, wherein the assembly includes a first link and a second link, an end of the first link and an end of the second link are connected for relative pivotal movement, another end of the first link is supported so as to be moved circumferentially of the operation member upon rotation thereof, another end of the second link is pivotally supported at a fixed point, and an end of the control cable is connected to the second link.

According to the present invention, the operation member may be generally cylindrical for rotational operation around a handlebar of the bicycle. Further, said another end of the first link may be connected to the operation member or a member rotating with the the operation member. Said another end of the second link may be connected to a fixed shaft supported by a member which is fixed to the handlebar of the bicycle.

In the present invention, upon rotation of the operation member said one end of the first link is displaced circumferentially of the operation member with the rotation of the operation member. Thus, the second link pivots to pull or pay out the control cable, thereby causing the speed change device of the bicycle to perform a speed change operation.

The link mechanism constituted by the first link and the second link is a force-magnifying mechanism wherein the displacement of each portion of the second link is made smaller than that of the displacement of said one end of the first link circumferentially of the operation member. Thus, it is possible to make the pulling or paying-out amount for the control cable smaller than the rotational operation amount of the operation member to move said one end of the first link, thereby enabling a small amount of pulling or paying-out of the control cable by rotating the operation member by a large angle. As a result, it is possible to ensure a reliable speed change operation for one stage after another for the speed change device of the bicycle, thereby improving the handling performance of the speed change device.

According to the present invention, unlike the prior art, the control cable is pulled or paid out directly by the second link, thereby avoiding a large frictional resistance in operating the control cable. The link mechanism constituted by the first link and the second link works to convey the magnified rotational operation torque of the operation member to the control cable. Therefore, it is possible to advantageously make the rotational torque needed to operate the operation member smaller than that of the prior art, thereby improving the handling performance.

According to a preferred embodiment of the present invention, the first link has a concave surface fitting on an outer surface of a member which faces a movable portion of the first link.

With such an arrangement, in shifting the first link circumferentially of the operation member by rotating the operation member, the concave surface of the first link can be fitted on the outer surface of the member which faces the movable portion of the first link, thereby preventing interference between the member and the first link. As a result, the displacement of the first link can be made large, while the bulging of the first link around the member is reduced as much as possible.

According to another preferred embodiment of the present invention, the second link has a concave surface fitting on an outer surface of a member which faces a movable portion of the second link.

With such an arrangement, in pivoting of the second link, the concave surface of the second link can be fitted on the outer surface of the member which faces a movable portion of the second link, thereby preventing interference between the member and the second link. As a result, a large bulging of the second link around the member can be prevented as much as possible, thereby advantageously reducing the bicycle speed change operation assembly as a whole in size.

According to another preferred embodiment of the present invention, where the operation member is generally cylindrical for rotational operation around the handlebar of the bicycle, the second link may be arranged to be vertically pivotable below the handlebar of the bicycle.

With such an arrangement, the second link can be prevented as much as possible from largely bulging around the handlebar forward and backward of the bicycle. Further, the first link connected to the second link can be arranged to take a position in which the longitudinal direction of the first link coincides the vertical direction, so that the first link is prevented as much as possible from largely bulging relative to the handlebar forward and backward of the bicycle. In this way, it is possible to prevent the entirety of the link mechanism constituted by the first link and the second link from bulging relative to the handlebar forward and backward of the bicycle. Thus, advantageously, size reduction and improved outer appearance for the assembly as a whole are obtainable.

According to another preferred embodiment of the present invention, the assembly may comprise a positioning mechanism which is capable of holding the operation member at a plurality of predetermined rotational angular positions.

With such an arrangement, the holding of the operation member at a desired rotational angular position allows the pulling amount for the control cable to be maintained at a constant value. Thus, it is possible to properly keep the speed change level for the speed change device at a desired value.

According to another preferred embodiment of the present invention, the positioning mechanism may comprise an engaging member movable with the operation member, a positioning plate having a plurality of engaging bores, and a spring member for elastically urging the engaging member toward the positioning plate to bring the engaging member into releasable engagement with each of the plurality of engaging bores.

According to such an arrangement, rotation of the operation member can be prevented by bringing the engaging member into engagement with one of the plurality of engaging bores of the positioning plate, so that the operation angle of the operation member is maintained at a constant level. Thus, whenever the speed change device is caused to perform a desired speed change operation, the speed change device can be properly held at a desired speed change level.

According to another preferred embodiment of the present invention, the positioning plate may be rotatable by a predetermined angle in a rotating direction of the engaging member to enable an overshift of the speed change device of the bicycle.

With such an arrangement, in causing the speed change device to perform a speed change operation by pulling the control cable, the operation member can be rotated additionally by a predetermined angle with the positioning plate to pull the control cable in an amount greater than needed for the speed change operation of the speed change device for performing overshift operation. Such an overshift function makes it possible to reliably perform a speed change operation of the speed change device.

According to another preferred embodiment of the present invention, the positioning mechanism may comprise a plurality of engaging recesses rotatable with the operation member, an engaging member arranged to face the plurality of engaging recesses, and a spring member for elastically urging the engaging member in facing relation to the plurality of engaging recesses to bring the engaging member into releasable engagement with each of the plurality of engaging recesses.

With such an arrangement, by bringing the engaging member into engagement with one of the plurality of engaging recesses, the operation member is prevented from rotating and the operational angle of the operation member is maintained at a desired operational angle and the speed change device can be held at a desired value of the speed change levels. Since the above positioning plate is not necessarily required, the over all structure can be simplified.

According to another preferred embodiment of the present invention, the engaging member may be reciprocally movable within a predetermined range in a rotating direction of the plurality of engaging recesses to enable an overshift of the speed change device of the bicycle.

With such an arrangement, in causing the speed change device to perform a speed change operation by pulling the control cable, the operation member can be additionally rotated beyond a predetermined angle by shifting the engaging member in engagement with an engaging recess in the rotating direction of the plurality of engaging recesses to realize an overshift wherein the control cable is pulled in an amount greater than needed for a speed change operation of the speed change device. Such an overshift function makes it possible to reliably perform the speed change operation of the speed change device.

According to another preferred embodiment of the present invention, the spring member may be arranged not to urge the engaging member toward an inner wall of any one of the plurality of engaging recesses when the engaging member comes into engagement with said any one of the plurality of engaging recesses.

With such an arrangement, when the engaging member is held in engagement with one of the engaging recesses, the engaging member is not urged toward the inner wall of the engaging recess by the spring member. Thus, it is possible to prevent the operation member from suffering deterioration of the handling performance, which would otherwise be caused due to large contact friction between the engaging member and the inner wall of the engaging recess. Particularly, in performing an overshift operation wherein the operation member is rotated in an amount greater than needed for a desired speed change operation of the speed change device, the operation member can be advantageously brought back to the actual angular position by the tension acting on the control cable after the overshift.

According to another preferred embodiment of the present invention, the assembly may comprise a positioning ring which releasably engages the operation member and the plurality of engaging recesses are formed in the positioning ring.

With such an arrangement, when the plurality of engaging recesses are intended to be modified correspondingly to the specifications of the bicycle speed change device, the modification can only be made to the positioning ring. Specifically, when modifying the bicycle speed change device having a six-speed function to that having a seven-speed function, the number of the engaging recesses is needed to vary accordingly. Such a modification is possible only by altering the positioning ring. Thus, design specifications can be easily changed correspondingly to the speed change device.

According to another preferred embodiment of the present invention, the positioning ring may be rotatable within a predetermined angular range relative to the operation member to enable an overshift of the speed change device of the bicycle.

With such an arrangement, in causing the speed change device to perform a speed change operation by pulling the control cable, it is possible to provide an overshift function wherein the control cable is pulled in an amount greater than needed for the speed change operation by rotating the operation member with the positioning ring more beyond a predetermined angle.

According to another preferred embodiment of the present invention, the assembly may comprise a cable supporting guide pivotable with the second link about a fixed shaft which is concentric with a pivot center of the second link. The cable supporting guide has a guide surface for supporting the control cable in contact therewith, and the guide surface is configured in an arcuate form which is concentric with a pivot center of the cable supporting guide.

With such an arrangement, in pulling the control cable by the second link, the control cable can be guided along the arcuate guide surface of the cable supporting guide, so that the control cable is prevented from unduly bending. Thus, it is possible to prevent the control cable from suffering damages which would otherwise be caused by the bending of the control cable.

The control cable is not guided by the guide surface of the cable supporting guide in sliding contact therewith, but guided by the cable supporting guide which pivots in the pulling direction for the control cable. Therefore, no large frictional force is generated between the control cable and the cable supporting guide for pulling the control cable, thereby requiring less rotational operation torque for the operation member to pull the control cable.

Further, the control cable is guided by the arcuate guide surface which is concentric with the pivot center of the second link. Therefore, the actual pulling or paying-out length of the control cable connected to the second link can be rendered to exactly correspond to the pivot angle of the second link. As a result, the setting of the pulling or paying-out amount for the control cable is facilitated. If the displaced length of the control cable does not exactly correspond to the pivot angle of the second link, it becomes difficult to determine a desired displaced length of the control relative to the rotational operation angle of the operation member. However, the above arrangement makes it possible to avoid such an inconvenience.

According to another preferred embodiment of the present invention, said end of the control cable may be connected to the second link so that said end of the control cable is pulled along a straight path from an upper portion of a cable guide when the second link pivots.

With such an arrangement, the control cable can be properly pulled by the second link without using the cable supporting guide described above, thereby requiring less parts. Since the control cable pulled by the second link follows a straight path, the control cable is prevented from disadvantageously suffering an inconvenience such as bending. Further, in pulling the control cable, it is possible to prevent the control cable from suffering a frictional force which would otherwise occur on the control cable due to contacting other members. Sill further, the pulling length of the control cable can be arranged to properly correspond to the rotational operation angle of the operation member.

BRIEF DESCRIPTION OF THE DRAWINGS

FIG. 5a is a front view showing an example of operation members, whereas FIG. 5b is a half sectional view taken along lines X2—X2 in FIG. 5a;

FIG. 6a is a front view showing another example of operation members, whereas

FIG. 7a is a front view showing an example of positioning plates, whereas

FIG. 9a is a side view showing an example of fixing rings, whereas

FIG. 21 is an exploded perspective view showing the bicycle speed change operation assembly shown in FIG. 18;

FIG. 22a is a front view showing another example of operation members, whereas

FIG. 23a is a side view showing an example of ring members, whereas

FIG. 24a is a front view of a positioning plate, whereas

FIG. 41a illustrates an example of conventional bicycle speed change operation assemblies, whereas

BEST MODE FOR CARRYING OUT THE INVENTION

A first embodiment of the present invention will be described with reference to FIGS. 1–14.

Figure 1:
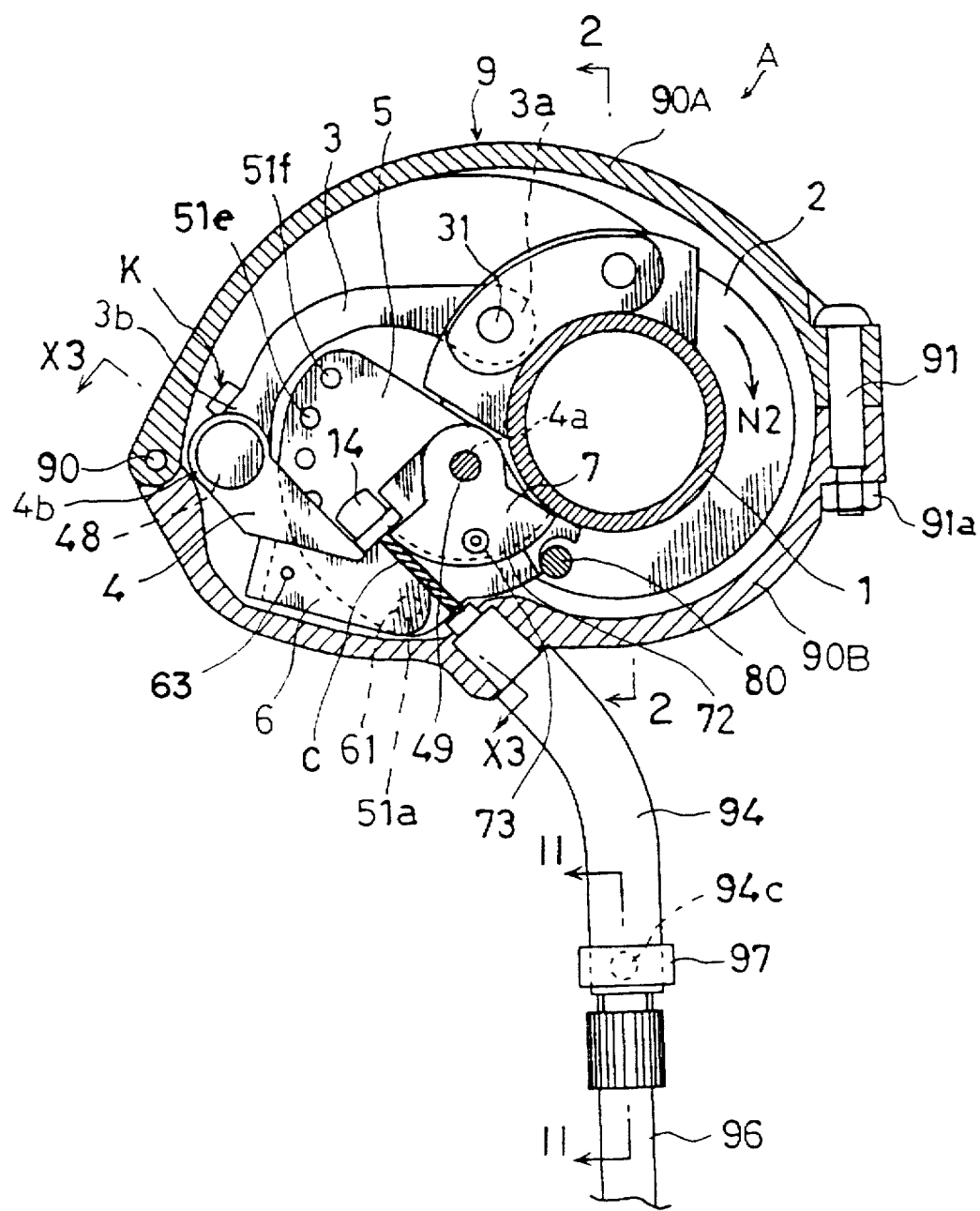
FIG. 1 is a sectional view illustrating an example of bicycle speed change operation assemblies according to the present invention.
Figure 2:
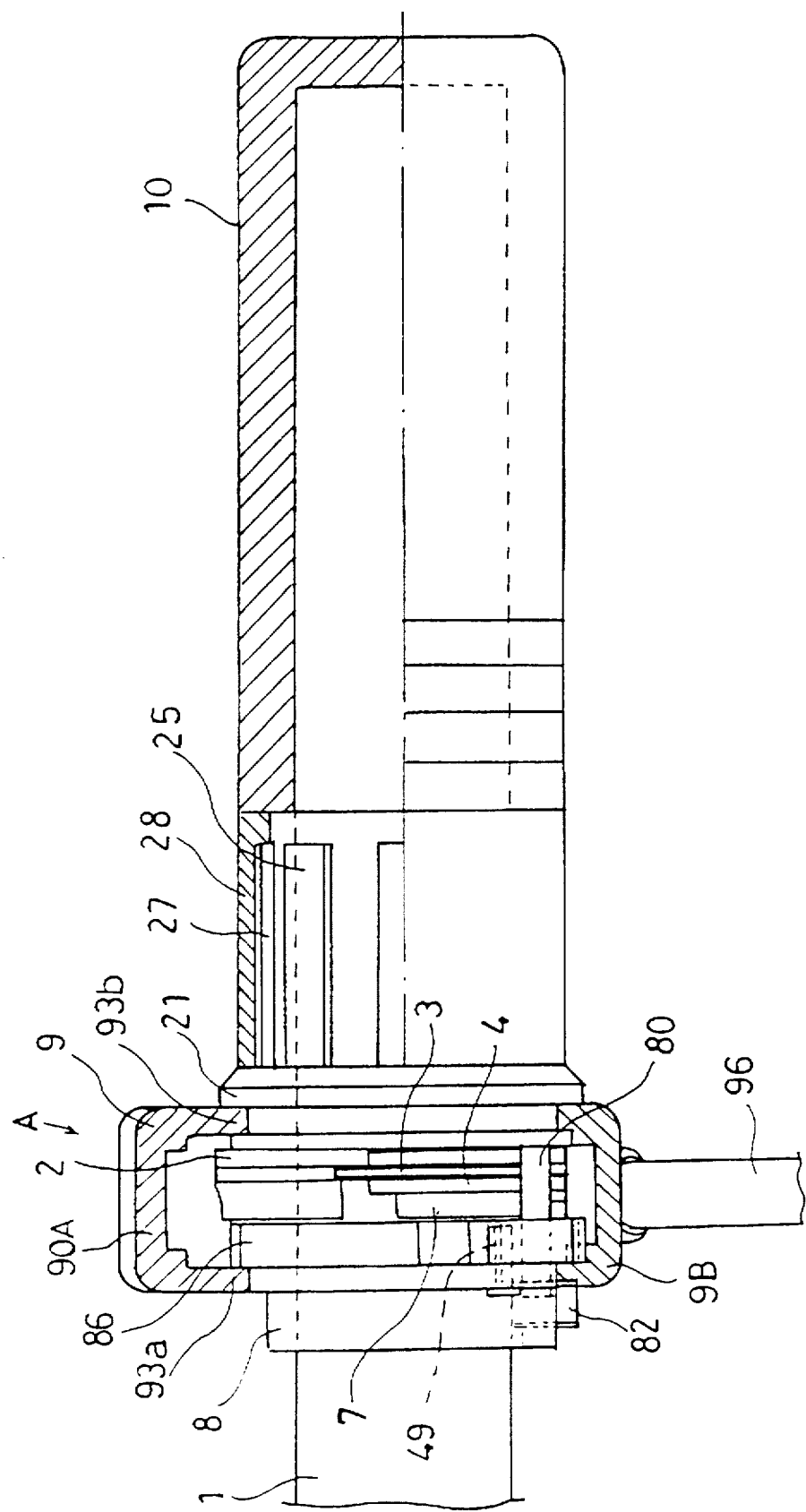
FIG. 2 is a half sectional view of principal parts taken along lines X1—X1 in FIG. 1.
Figure 4:
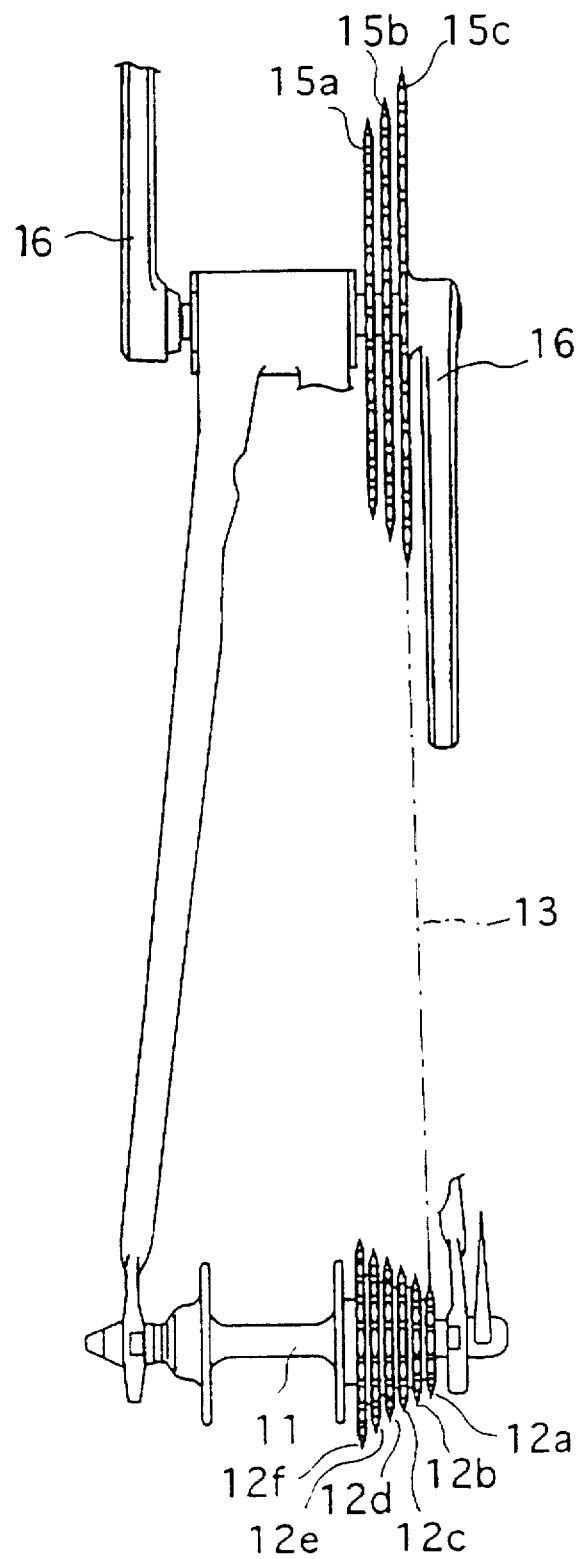
FIG. 4 is a plan view showing principal parts of an example of front and rear gears of a bicycle.

In FIGS. 1 and 2, a bicycle speed change operation assembly A for causing a bicycle rear derailleur (not shown) to perform a speed change operation is mounted adjacent to a right-hand grip 10 of a handlebar 1 made of a metal pipe. The rear derailleur is used for shifting a chain 13 among rear gears including 6-speed freewheels 12a–12f mounted on a hub 11 of the rear wheel of the bicycle as shown in FIG. 4 for example and includes a guide pulley for pushing the chain 13 for lateral movement, a tension pulley located therebelow for taking up the slack of the chain, and the like. A bicycle front derailleur described hereinafter is used for shifting the chain 13 among 3-speed front gears 15a–15c.

The above-described rear derailleur is designed as a top-normal type and performs sequential shifting events of the chain 13 from a top gear 12a for the sixth speed level to a low gear 12f for the first speed level when a control cable C (inner wire) connected to the rear derailleur is pulled in the direction of the bicycle speed change operation assembly A. Conversely, when the control cable C is paid out from the bicycle speed change operation assembly A toward the rear derailleur, the chain 13 is shifted in the direction opposite to the above-mentioned direction. The derailleur includes a pantograph mechanism with a spring (not shown), and the spring force is always exerted on the control cable C to cause the chain 13 to engage the diametrically smallest top gear 12a when the control cable C is not pulled toward the bicycle speed change operation assembly A.

The bicycle speed change operation assembly A is constituted by an operation member 2 externally fitted about the handlebar 1 for rotational movement, a first link 3 and a second link 4 which constitute a link mechanism, a positioning plate 5 for positioning the second link 4, a spring member 6, a cable support guide 7 for supporting and guiding the control cable C, a fixing ring 8 attached externally about the handlebar 1, and a housing case 9 accommodating the above elements for protection thereof.

Figure 5A:
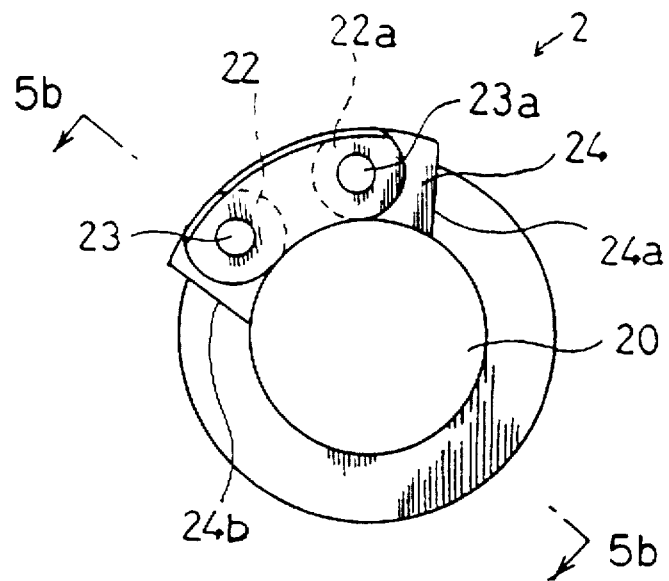
Figure 5B:
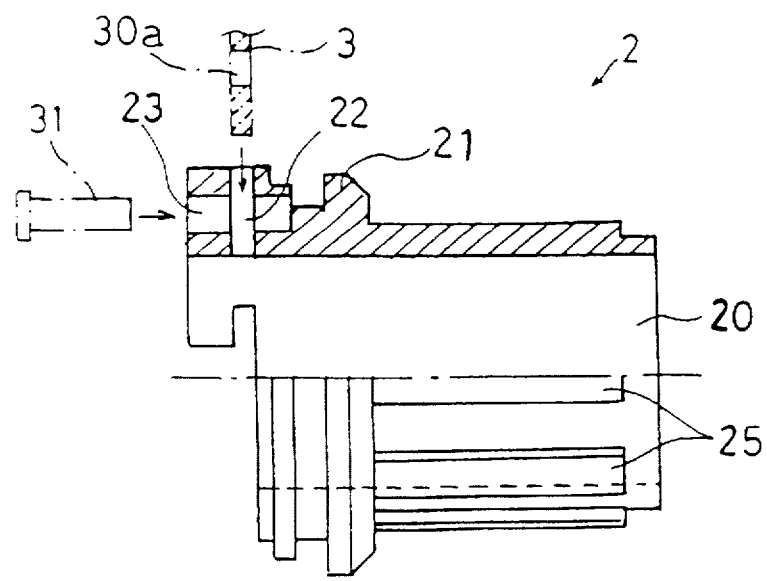

As shown in FIGS. 5a and 5b, the operation member 2 is generally cylindrical having a through-hole 20 and a flange 21 and can be externally fitted about the bicycle handlebar 1. The operation member 2 has an end surface formed with bores 23, 23a as well as with grooves 22, 22a, each of which has a generally circular front view, at the locations of the bores 23, 23a. Of these, the groove 22 and the bore 23 are used for pivotally connecting a first end 3a of the first link 3 to the operation member 2. Specifically, as shown by single-dot chain lines in FIG. 5b, the first end 3a of the first link 3 is inserted into the groove 22 and thereafter a pin 31 is inserted through the bore 23 of the operation member 2 and the through-hole 30a of the first link 3, thereby connecting the first link to the operation member 2 for pivotal movement about the pin 31. Thus, upon rotation of the operation member 2 externally fitted about the handlebar 1, the first end 3a of the first link 3 is moved around the handlebar with the rotation of the operation member 2. In the arrangement of a speed change operation assembly Aa (FIG. 15) mounted on the left-hand end of the handlebar 1 for the below-described front derailleur, the other groove 22a and bore 23a are used for fixation of a first link 3 of the speed change operation assembly Aa.

Figure 13:
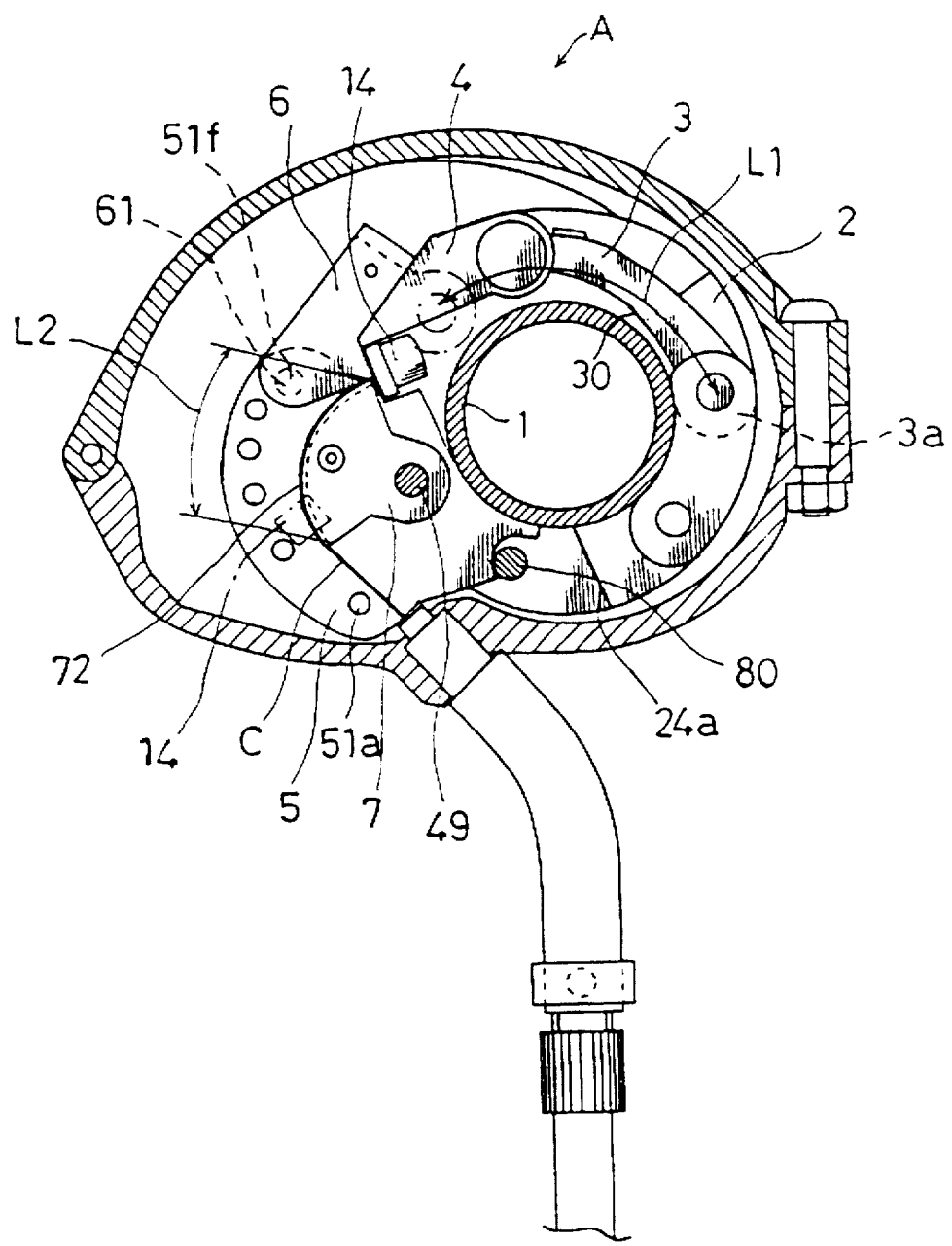
FIG. 13 is a sectional view illustrating the bicycle speed change operation assembly of FIG. 1 in operation.

The operation member 2 includes at one end surface thereof a stepped portion 24 providing an arcuate front view. When the operation member 2 is rotated as shown in FIG. 13, the stepped portion 24 functions as a stopper by causing an end surface 24a of the stepped portion 24 to come into engagement with a first fixed shaft 80 attached to a fixing ring 8, thereby preventing any further rotational movement of the operation member 2. The other end surface 24b of the stepped portion 24 will be used for engagement with the first fixed shaft 80 of the speed change operation assembly Aa in application of the operation member 2 for the speed change operation assembly Aa described hereinafter.

As shown in FIG. 5b, the operation member 2 is formed with projections 25 on the external surface located on a side of the flange 21, wherein the projections extend longitudinally of the operation member 2. As shown in FIG. 2, for external fitting of a tubular operation grip 28 of synthetic rubber on the operation member 2, the projections 25 fittingly engage spline grooves 27 formed in the internal surface of the operation grip 28. This renders the operation member 2 and the operation grip 28 mutually engaged, unable to perform a relative rotational movement. Thus, the operation member 2 will rotate about the handlebar with the rotational operation of the operation grip 28.

Figure 6A:
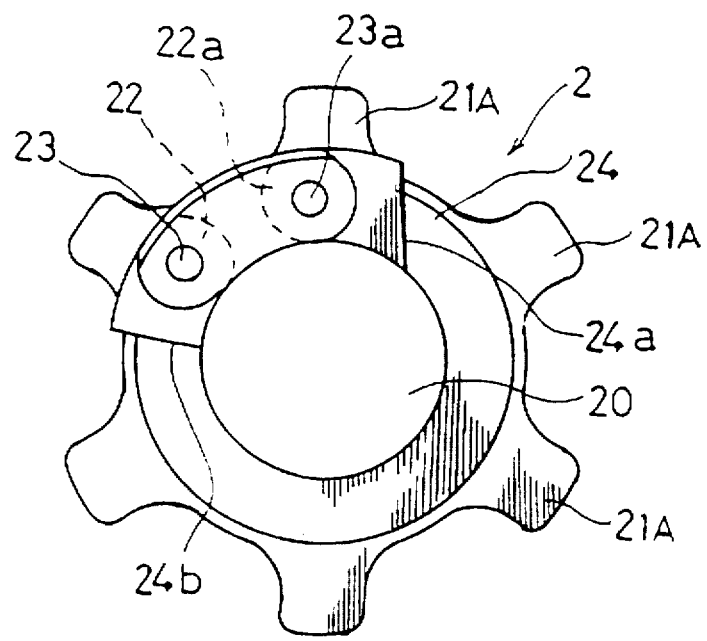
Figure 6B:
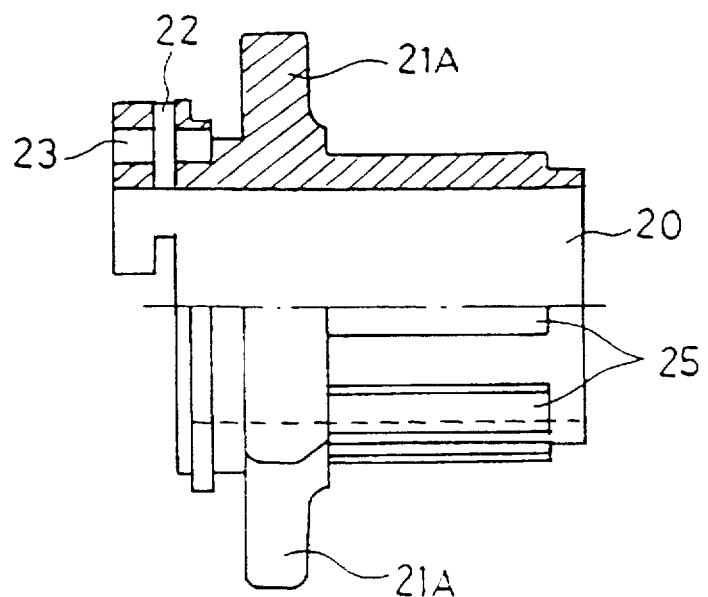
FIG. 6b is a half sectional view of the same.

The operation member 2 may be formed with a plurality of radially extending projections 21A, as shown in FIGS. 6a and 6b for example, instead of the flange 21 shown in FIG. 5b. With the operation member 2 having such an arrangement, the cyclist can rotate the operation member 2 by engaging a finger with the plurality of projections 21A, thereby facilitating the rotational operation of the operation member 2.

Figure 3:
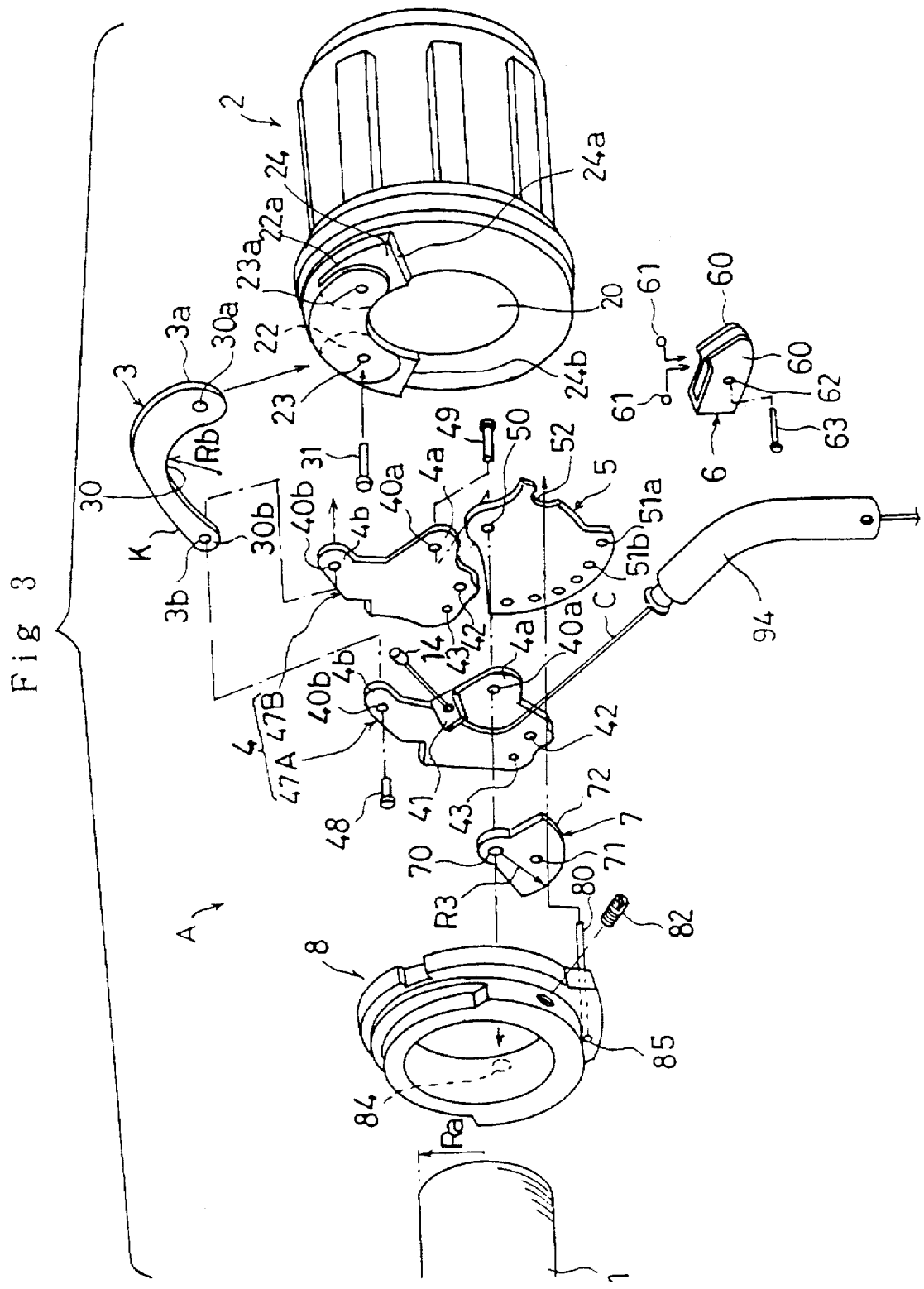
FIG. 3 is an exploded perspective view of the bicycle speed change operation assembly illustrated in FIG. 1.

As shown in FIG. 3, the first link 3 is made in a form of a thin plate. The first link 3 has a curved configuration and includes a concave surface 30 whose radius of curvature is equal or generally equal to the radius Ra of the handlebar 1. Therefore, upon rotation of the operation member 2 as shown in FIG. 13 for example, the concave surface 30 of the first link 3 is brought into fitting engagement with the outer surface of the handlebar 1. Thus, the first link 3 can rotate around the handlebar without bulging.

The second link 4 is constituted by a pair of plates 47A, 47B, as shown in FIG. 3. These two plates 47A, 47B are similar in appearance for example. However, of the two, the plate 47A is formed with a control cable connecting portion 41 for inserting the control cable C and fixing a nipple 14 attached at an end of the control cable C.

The pair of plates 47A, 47B are formed with throughholes 40a, 40a at their respective first ends 4a, 4a. A second fixed shaft 49 is inserted through the respective throughholes 40a, 40a of the two plates 47A, 47B in series. The second fixed shaft 49 is attached to the fixing ring 8 like the first fixed shaft 80. A second end 3b of the first link 3 is inserted between respective second ends 4b, 4b of the plates 47A, 47B, and a connecting pin 48 is inserted in series through the through-holes 40b, 40b of the plates 47A, 47B and the through-hole 30b in the second end 3b of the first link 3. The second end 3b of the first link 3 and the second end 4b of the second link 4 are connected via the connecting pin 48 for relative pivotal movement.

Figure 7A:
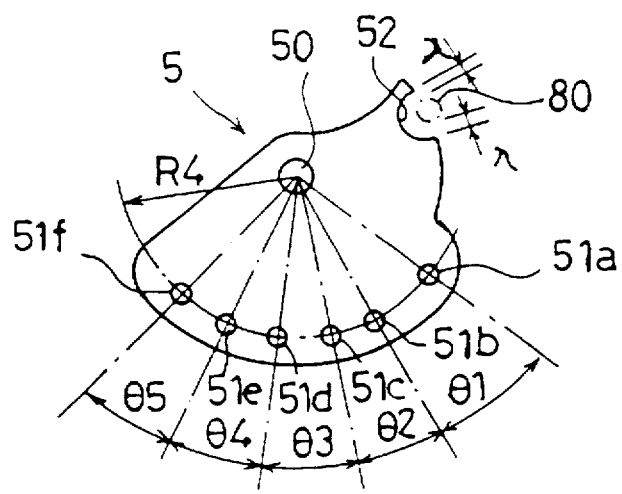
Figure 7B:
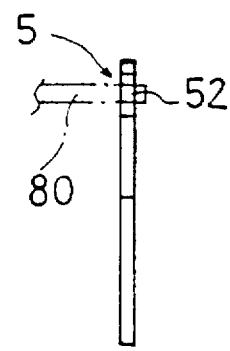
FIG. 7b is a side view of the same.

As shown in FIGS. 7a and 7b, the positioning plate 5 includes a bore 50 and six engaging bores 51a–51f arranged along a circle cocentric with the bore 50 and having a predetermined radius R4. As shown in FIG. 3, an upper part of the positioning plate 5 will be located between the respective first ends 4a, 4a of the pair of plates 47A, 47B constituting the second link 4. The bore 50 receives the second fixed shaft 49 extending therethrough. Thus, the positioning plate 5 can pivot around the second fixed shaft 49 in the same direction as the pivotal direction of the second link 4.

However, the first fixed shaft 80 is arranged to extend through a semicircular cutout 52 formed in an edge of the positioning plate 5. The outside diameter of the first fixed shaft 80 is smaller than the inside diameter of the cutout 52. Thus, as shown in FIG. 7a, the positioning plate 5 can pivot around the fixed shaft 49 extending through the bore 50 by a small angular range of clearance A formed between the inner surface end of the cutout 52 and the outer surface of the first fixed shaft 80. The maximum pivotal angle of the positioning plate 5 is smaller than respective pitch angles θ1–θ5 defined between the engaging bores 51a–51f.

As shown in FIG. 3, the spring member 6 has an overall configuration similar to tweezers providing a U-shaped front view and includes a pair of opposite pieces 60, 60. The pair of opposite pieces 60, 60 are designed to provide an urging toward each other, and therebetween are provided two metal balls 61, 61, which are an example of engaging members of the present invention, thus constituting a positioning mechanism shown in FIG. 8.

Figure 8:
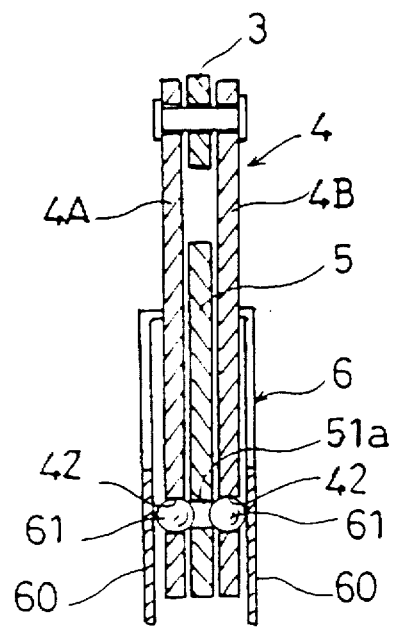
FIG. 8 is a sectional view of principal parts taken along lines X3—X3 in FIG. 1.

Specifically, in the positioning mechanism shown in FIG. 8, the balls 61, 61 are fitted into respective bores 42, 42 formed in the pair of plates 47A, 47B constituting the second link 4. The spring member 6 is mounted on the pair of plates 47A, 47B, and their opposite pieces 60, 60 elastically urge the balls 61, 61 in an approaching direction to each other. With such an arrangement, the balls 61, 61 can be brought into releasable engagement with the engaging bore 51a as well as each of the other engaging bores 51b–51f of the positioning plate 5. Specifically, supposing that the balls 61, 61 are fitted into the engaging bore 51a of the positioning plate 5 at first, when the second link 4 is caused to pivot about the second fixed shaft 49, the balls 61, 61 can be moved out of the engaging bore 51a to engage the neighboring engaging bore 51b. Similarly thereafter, the balls 61, 61 can be brought into releasable engagement with the other engaging bores 51c–51f one after another.

The spring member 6 should be secured to the second link 4. For this purpose, as shown in FIG. 3 for example, the spring member 6 and the second link 4 are connected via a pin 63 extending in series through a pin bore 62 of the spring member 6 and respective pin bores 43, 43 formed in the plates 47A, 47B.

The cable supporting guide 7 is made in a form of a generally sectorial plate as a whole and has two throughholes 70, 71. The through-hole 70 receives the second fixed shaft 49 extending therethrough. The other through-hole 71 is provided for fixing the cable supporting guide 7 to the plate 47A via e.g. a rivet 73 as shown in FIG. 1. Thus, the cable supporting guide 7 pivots with the second link 4 about the second fixed shaft 49 extending through the through-hole 70.

The cable supporting guide 7 also has an arcuate guide surface 72 concentric with the second fixed shaft 49 and the through-hole 70, which are the pivot center of the cable supporting guide 7. As shown in FIG. 1, the control cable C is supported by the guide surface 72 in contact therewith. Therefore, the guide surface 72 is preferably provided with a groove or projections for example to prevent the control cable C from coming off the guide surface 72. The radius of curvature of the guide surface 72 corresponds to the winding radius for the control cable C and is smaller than the radius R4 of the circle shown in FIG. 7, along which the engaging bores 51a–51f of the positioning plate 5 are provided.

Figure 9A:
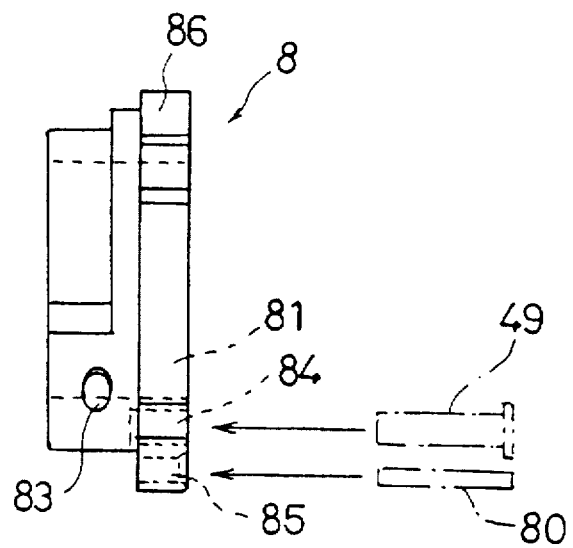
Figure 9B:
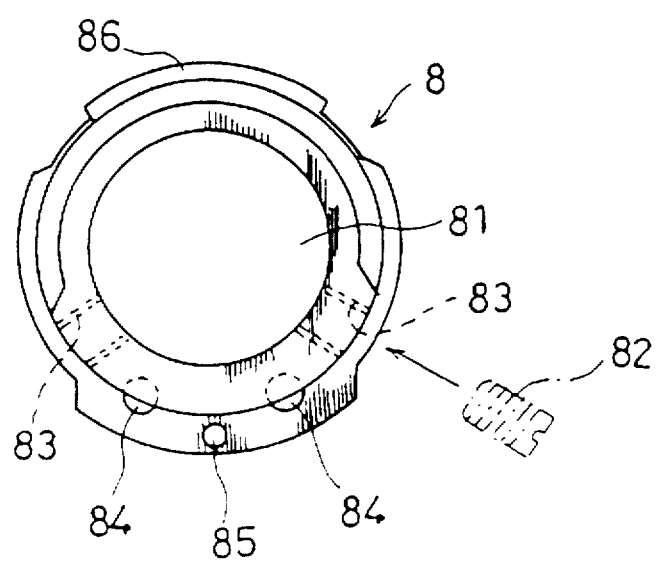
FIG. 9b is a front view of the same.
Figure 10:
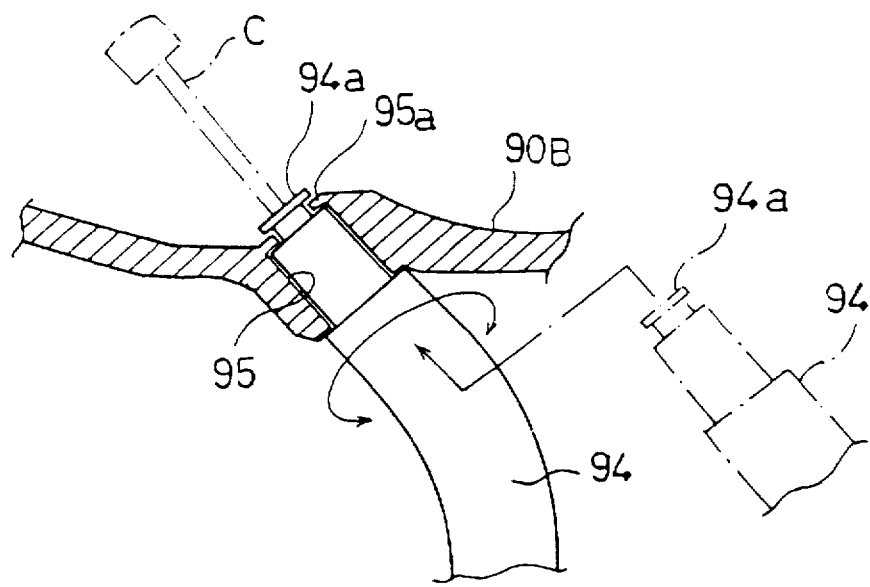
FIG. 10 is an enlarged sectional view showing principal parts of an example of fixing arrangements for a cable guide.

As shown in FIGS. 9a and 9b, the fixing ring 8 has a through-hole 81 by which the fixing ring 8 is externally fitted around the handlebar 1 of the bicycle. The fixing ring 8 has an outer surface formed with threaded bores 83, 83 each for engaging a set screw 82. The fixing ring 8 can be non-rotatably positioned on the handlebar 1 by pressing the front end of each set screw 82 onto the outer surface of the handlebar 1. Further, the fixing ring 8 has a side surface formed with two bores 84 for attaching the second fixed shaft 49 extending therethrough and a bore 85 for attaching the first fixed shaft 80 extending therethrough. Two of the bores 84 are formed so that the fixing ring 8 can be also applied to the front derailleur speed change operation assembly Aa mounted on the left-hand end of the handlebar 1.

As shown in FIG. 1, the housing case 9 is formed by two separate members, an upper member 90A and a lower member 90B. The upper member 90A and the lower member 90B are connected at respective ends thereof via a shaft 90 for relative pivotal movement. The other ends of the respective upper member 90A and lower member 90B are bolted by a bolt 91 and a nut 91a. Thus, the housing case 9 can be fixed by clamping part of the outer edge of the fixing ring 8 secured on the handlebar 1.

The lower member 90B is provided with a bore (not shown) through which the first fixed shaft 80 secured to the fixing ring 8 is inserted, thereby preventing the housing case 9 as a whole from rotating around the handlebar. As shown in FIG. 2, side walls 93a, 93b of the housing case 9 are brought into engagement with the flange 86 of the fixing ring 8 and the flange 21 of the operation member 2, thereby enabling longitudinal positioning along the handlebar 1. Members such as the first link 3 and the second link 4 for example are accommodated within the housing case 9.

The housing case 9 may be made of opaque synthetic resin or alternatively of transparent resin. In using transparent resin for the housing case 9, a pointer K as an indicator can be provided at a suitable portion of the first link 3 shown in FIG. 1, and the cyclist can see the pointer K through the housing case 9 from above. Therefore, by providing the outer surface of the housing case 9 with a scale or the like to indicate what speed level the rear derailleur is aligned with, the cyclist can know the position of the first link 3 and consequently the speed level of the rear derailleur by looking at the scale and the pointer K.

In the bicycle speed change operation assembly A, the upper member 90A of the housing case 9 has a curved cross section. Therefore, when the pointer K is seen from outside, the pointer K is seen refracted, thereby giving an neater appearance to the pointer K and the housing case 9 as well as to the assembly as a whole. Means to make the pointer K at the first link 3 recognizable from outside is not limited to the arrangement where the entirety of the housing case 9 is made of transparent resin. Alternatively, transparent resin may be used only for a portion corresponding to the pointer K.

A cable guide 94 for guiding the control cable C is connected to the lower member 90B of the housing case 9. The cable guide 94 is made in a form of a curved tube for example to allow passage of the control cable C therethrough. The connection of the cable guide 94 to the lower member 90B may be arranged as in FIG. 10. Specifically, in the illustrated arrangement, an end of the cable guide 94 is inserted into a through-hole 95 formed in the bottom surface of the lower member 90B. However, the above-mentioned end of the cable guide 94 is provided with a thin flange 94a, and the through-hole 95 is formed with an inward projection 95a for fixing the flange 94a. According to such an arrangement, the cable guide 94 is rotatably connected to the lower member 90B by the engagement between the flange 94a and the projection 95a. Thus, it is possible to pay out the control cable C in a suitable direction by properly rotating the cable guide 94.

The outside diameter of the flange 94a is rendered larger than the inside diameter of the projection 95a. However, if the lower member 90B is made of synthetic resin, the insertion of the above-mentioned end of the cable guide 94 into the through-hole 95 is performed by forcing the projection 95a to be elastically deformed into the through-hole 95. Thus, the connection of the cable guide 94 does not require any screws and the like, thereby simplifying the connecting process.

Figure 11:
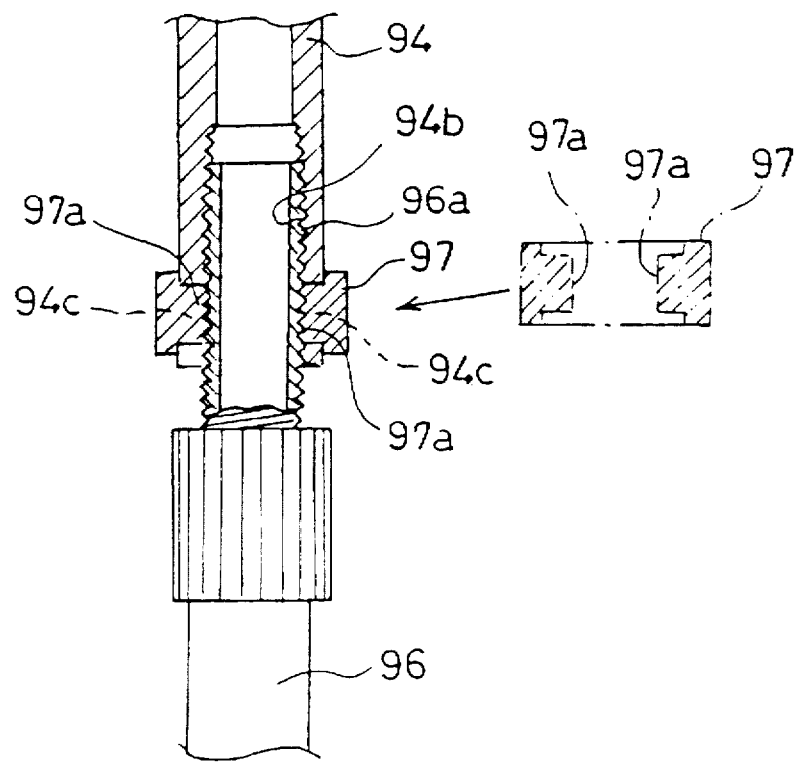
FIG. 11 is a sectional view of principal parts taken along lines X4—X4 in FIG. 1.

As shown in FIG. 11, an outer cable 96 for guiding and protecting the control cable C is connected to the other end of the cable guide 94. The connection of the outer cable 96 can be accomplished by bringing a threaded portion 96 connected to the end of the outer cable 94 into engagement with a threaded portion 94b formed in the inner surface of the other end of the cable guide 94.

With such a connecting arrangement, it is necessary to prevent the threaded portion 96a from becoming loose. According to the illustrated embodiment, the following means is adopted. Specifically, the cable guide 94 is externally provided with a ring 97 made of resilient synthetic resin which is capable of stretching. The inner surface of the ring 97 is formed with a plurality of projections 97a, 97a to fit into two bores 94c, 94c formed in the outer wall of the cable guide 94. According to such means, the projections 97a, 97a of the ring 97 pressed into engagement with the threaded portion 96a makes it possible to suitably overcome the problem of loosening of the threaded portion 96a due to an inadvertent rotation thereof.

In assembling the bicycle speed change operation assembly A, first the fixing ring 8 is externally fitted on the handlebar 1. Then, the positioning plate 5, the second link 4, the cable supporting guide 7 and the like are put together. The one end of the control cable C is connected to the control cable connecting portion 41 of the second link 4. Then, after externally fixing the operation member 2 on the handlebar 1, the first link 3 is assembled, and then the housing case 9 is attached. The externally fitting step of an operation grip 28 on the operation member 2 or the externally fitting step of the hand grip 10 may be performed at a proper timing thereafter.

Figure 12:
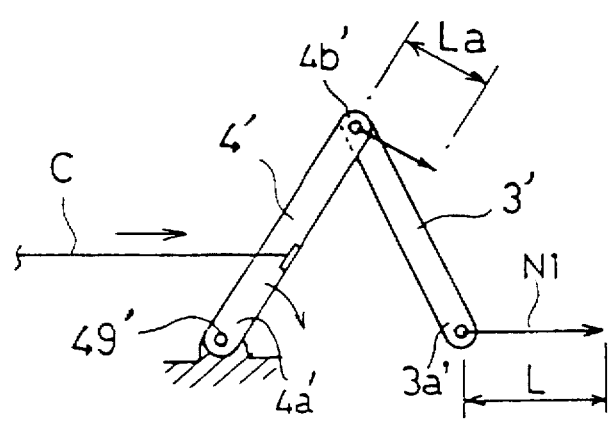
FIG. 12 illustrates the mechanical principle of the bicycle speed change operation assembly shown in FIG. 1.

In the bicycle speed change operation assembly A having the construction described above, the link mechanism constituted by the operation member 2, the first link 3 and the second link 4 functions according to the same principle as in a link mechanism shown in FIG. 12.

Specifically, in the link mechanism illustrated in FIG. 12, a first link 3' and a second link 4' are connected for relative pivotal movement, and an end 4a' of the second link 4' is supported by a second fixed shaft 49'. In such a mechanism, upon movement of an end 3a' of the first link 3' in the direction indicated by arrow N1, the second link 4' pivots about the second fixed shaft 49'. The displaced distance La of the end 4b' of the second link 4' is inevitably rendered smaller than the displacement L of the first link 3'. In the second link 4', the displacement of a portion thereof becomes smaller, as the portion comes closer to the end 4a' than the end 4b'. In other words, the link mechanism is arranged as a force-magnifying mechanism. Therefore, the control cable C connected to the second link 4' is pulled by an amount smaller than the displacement L of the first link 3', while the pulling of the the control cable C requires less force.

The bicycle speed change operation assembly A differs from the link mechanism illustrated in FIG. 12 in that the first end 3a of the first link 3 is moved not in a straight path but along a curved path with the rotational operation of the operation member 2. However, the pulling and paying-out amounts of the control cable C connected to the second link 4 of the bicycle speed change operation assembly A can be made smaller than the displacement of the first end 3a of the first link 3.

Specifically, upon rotation of the operation member 2 in the direction of arrow N2, starting from the state shown in FIG. 1 toward the angular position illustrated in FIG. 13, the first end 3a of the first link 3 connected to the operation member 2 moves by an amount L1. On the other hand, the displacement of each portion of the second link 4 is smaller than the amount L1, and the pulled displacement L2 of the control cable C connected to the second link 4 is much smaller than the amount L1. Further, the rotation angle of the second link 4 is smaller than the operation angle of the operation member 2.

Thus, in operation of the rear derailleur to perform speed changes by sequentially pulling the control cable C, even if only small amounts of pulling of the control cable C cause the rear derailleur to perform sequential speed change operations, the cyclist can rotate the operation member 2 by a large amount of rotational angle to cause the rear derailleur to properly perform the speed change operations one after another. As a result, the cyclist can reliably operate the rear derailleur for selection of a desired speed level of the rear derailleur.

Further, since the link mechanism constituted by the first link 3, the second link 4 and the like is a force-magnifying mechanism, the operation torque can be smaller for rotating the operation member 2 while the control cable C is pulled against the spring force of the rear derailleur.

The control cable C pulled by the second link 4 is guided by the arcuate guide surface 72 of the cable supporting guide 7, as shown in FIG. 13. The cable supporting guide 7 pivots about the second fixed shaft 49 in the same direction and by the same amount of angle as the second link 4 does. Thus, every portion of the guide surface 72 will brought into engagement with the same point of the control cable C or in other words the control cable C is not pulled in sliding contact with the cable supporting guide 7 for example. Therefore, it is possible to minimize the frictional force between the control cable C and the cable supporting guide 7, thereby preventing the pulling performance for the control cable C from deteriorating due to the frictional force between them.

Further, since the guide surface 72 is made in an arcuate form which is concentric with the pivot center of the second link 4, the control cable C is always guided by a constant angle from the upper end of the cable guide 94 toward the cable supporting guide 7, no matter how much the second link 4 may pivot. As a result, the control cable C is not unduly bent in pulling the control cable C by the second link 4. Further, with the guiding arrangement of the control cable C by the arcuate guide surface 72, the pivotal angle of the second link 4 can be rendered to accurately correspond to the actual pulling and paying-out amounts of the control cable C. As a result, it is easy to exactly determine the pulling and paying-out amounts of the control cable C in use with reference to the pivotal angle of the second link 4 and consequently the rotation angle of the operation member 2.

As the operation member 2 is sequentially rotated, the balls 61, 61 retained by the second link 4 are moved relative to the positioning plate 5, caused to leave the engaging bore 51a of the positioning plate 5 and brought into releasable engagement with each of the other engaging bores 51b–51f. The engaging bores 51a–51f of the positioning plate 5 are positioned to correspond to the speed change operations of the rear derailleur. The balls 61, 61 will engage the engaging bore 51a when the rear derailleur is shifted for the the sixth speed, whereas they will engage the engaging bore 51b when the derailleur is shifted for the fifth speed. Similarly thereafter, the balls will engage the respective engaging bores 51c–51f when the rear derailleur is sifted for the fourth speed to the first speed. In this way, it is possible to positionally retain the second link 4 at an intended pivotal angle by the engagement between the balls 61, 61 and the engaging bores 51a–51f, thereby retaining the rear derailleur for a desired speed level.

Figure 14A:
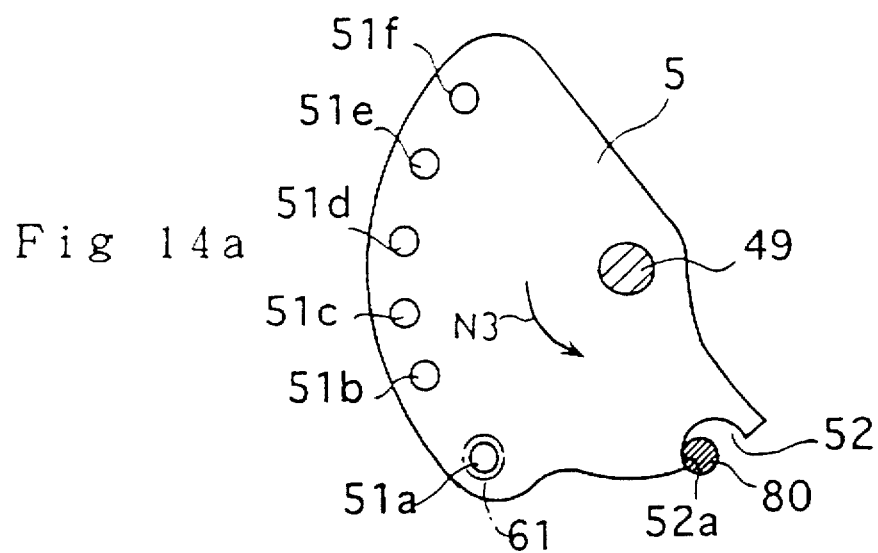
FIGS. 14a–14c illustrate a positioning mechanism in operation.

Next, the operational relation between the positioning plate 5 and the ball 61 in rotating the operation member 2 will be described. A spring force pulling the control cable C toward the rear derailleur always acts on the second link 4 and the positioning plate 5 engaging the second link 4. Thus, in a normal state where the cyclist keeps his hand off the operation grip 28, the spring force exerts a rotational force on the positioning plate 5 in the direction of arrow N3 so that an end 52a of the inner surface of the cutout 52 is held in a stabilized condition, resting on the first fixed shaft 80, as shown in FIG. 14a. The ball 61 is in engagement with the engaging bore 51a for example, thereby properly maintaining the rear derailleur at the position for the sixth speed.

Figure 14B:
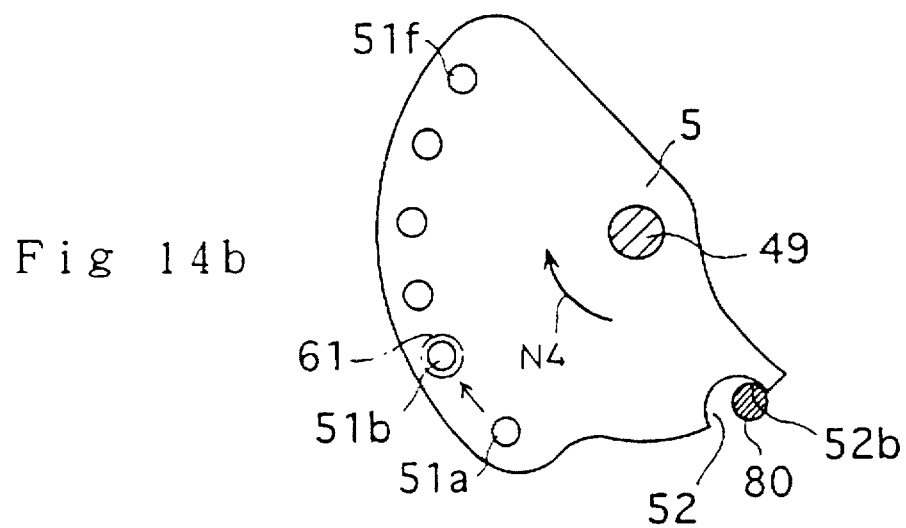

Then, in rotating the operation member 2 in the direction of arrow N4 shown in FIG. 14b to cause the ball 61 to leave the engaging bore 51a and engage the next engaging bore 51b, the positioning plate 5 can be rotated in the direction of arrow N4 until the other end 52b of the inner surface of the cutout 52 comes into contact with the first fixed shaft 80. Therefore, in shifting the rear derailleur from the position for the sixth speed to that for the fifth speed, the positioning plate 5 and the second link 4 engaging the positioning plate 5 can be rotated in the direction of arrow N4 additionally by an amount of the clearance between the cutout 52 and the first fixed shaft 80. Thus, the control cable C can be pulled by an amount slightly greater than needed to cause the rear derailleur to perform a speed change operation.

As a result, in shifting the chain 13 by pulling the control cable C, so-called overshift function is provided wherein the chain 13 is firstly displaced to a position beyond the free wheel 12b of the fifth speed by pulling the control cable C by an amount greater than needed to perform the shifting of the chain 13, and then the chain 13 is brought into engagement with the free wheel 12b of the fifth speed. According to this function, the shifting of the chain 13 can be accurately performed.

Figure 14C:
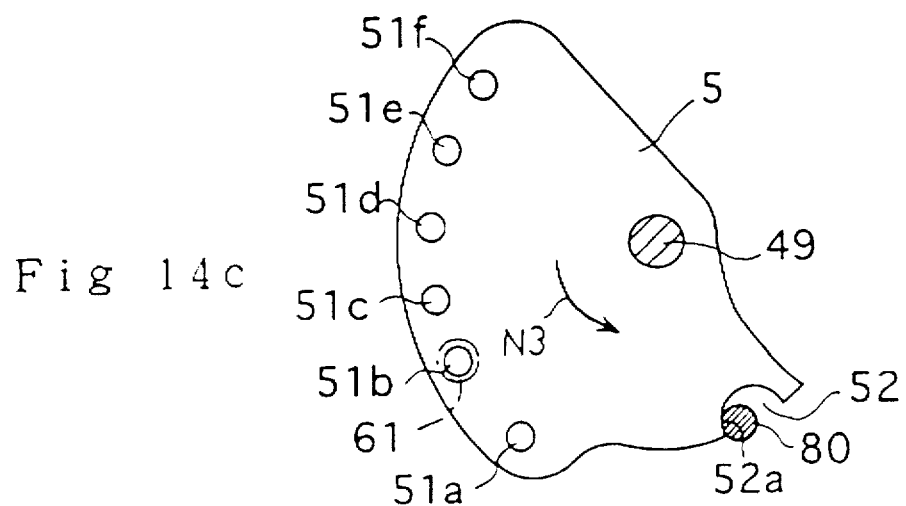

When the cyclist removes the hand from the operation grip 28 after the ball 61 is brought into engagement with the engaging bore 51b, the positioning plate 5 rotates slightly in the direction of arrow N3 again due to the tension of the control cable C (the spring force of the rear derailleur), as shown in FIG. 14c. Upon such an rotation of the positioning plate 5, the end 52a of the inner surface of the cutout 52 comes into contact with the first fixed shaft 80, thereby stabilizing the positioning plate 5. As a result, the chain 13 can be accurately retained at a position corresponding to the free wheel 12b. Such overshift function is obtainable not exclusively in performing the speed change operation from the sixth speed level to the fifth speed level but also in each of the speed change operations sequentially performed from the fifth speed level to the first speed level.

Further, the distance R4 from the second fixed shaft 49 as the pivot center of the second link 4 to the respective engaging bores 51a–51f of the positioning plate 5 is greater than the winding radius R3 for the control cable C. The spacing between the respective engaging bores 51a–51f of the positioning plate 5 is rendered greater than the pulling amount of the control cable C which is needed to cause the rear derailleur to perform one-step speed change operation. Therefore, for formation of the engaging bores 51a–51f in the positioning plate 5, there is no need to precisely machine the engaging bores 51a–51f to leave minute spacings therebetween, thereby facilitating production of the positioning plate 5.

In the rear derailleur, as the chain 13 is shifted from the top gear 12a to the low gear 12f due to the pulling of the control cable C by the speed change operation assembly A, the spring force urging the chain 13 back toward the diametrically small top gear 12a becomes stronger. In other words, as the speed change operation of the rear derailleur is performed from the sixth speed or top gear to the first speed or low gear, the force to pull the control cable C toward the rear derailleur will increase.

On the other hand, in the link mechanism constituted by the first link 3, the second link 4, the displacement of the first end 3a of the first link 3 is not proportional to the displacement of the second link 4. In other words, in the link mechanism, the displacements of the first end 3a of the first link 3 (the rotation angles of the operation member 2) necessary to cause the control cable C to be pulled sequentially by a constant amount through a constant pivot angle of the second link 4 are not the same. In the link mechanism, it can be so arranged by properly modifying each portion of the first link 3 and second link 4 in terms of size and connecting angle for example that the operation member 2 need be operated by a greater angle to pull a constant amount of the control cable C when the operation member 2 rotates further in the direction of arrow N2.

Specifically, it may be arranged that the spacings θ1–θ5 between the engaging bores 51a–51f of the positioning plate 5 illustrated in FIG. 7 are not equal. Of these, θ2–θ5 may be determined such that θ2<θ3<θ4<θ5 for example. According to the arrangement where the rotation angles of the operation member 2 for pulling a constant amount of the control cable C gradually increase, it is possible to increase the magnifying proportion of torque for rotation of the operation member 2, while the operation torque needed to rotate the operation member 2 can be reduced.

As a result, though the resisting spring force of the rear derailleur in pulling the control cable C increases as the rear derailleur shifts from the fifth speed gear to the first speed gear, the magnifying proportion of the rotation torque of the operation member 2 can be increased. Thus, totally, the operation torque of the operation member 2 needed to pull the control cable C can be equalized, thereby further facilitating the operation of the operation member 2.

Figure 15:
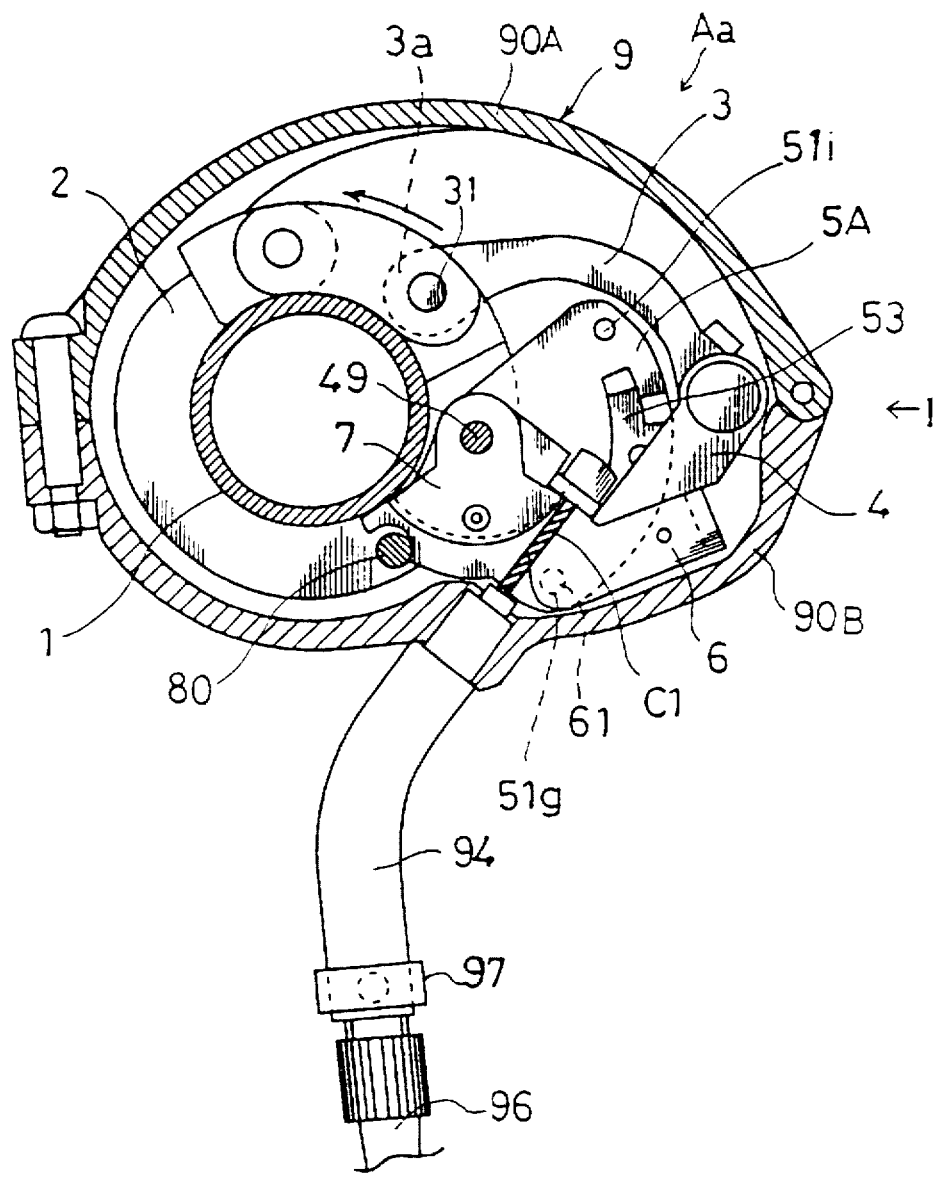
FIG. 15 is a sectional view showing another example of the bicycle speed change operation assemblies according to the present invention.
Figure 16:
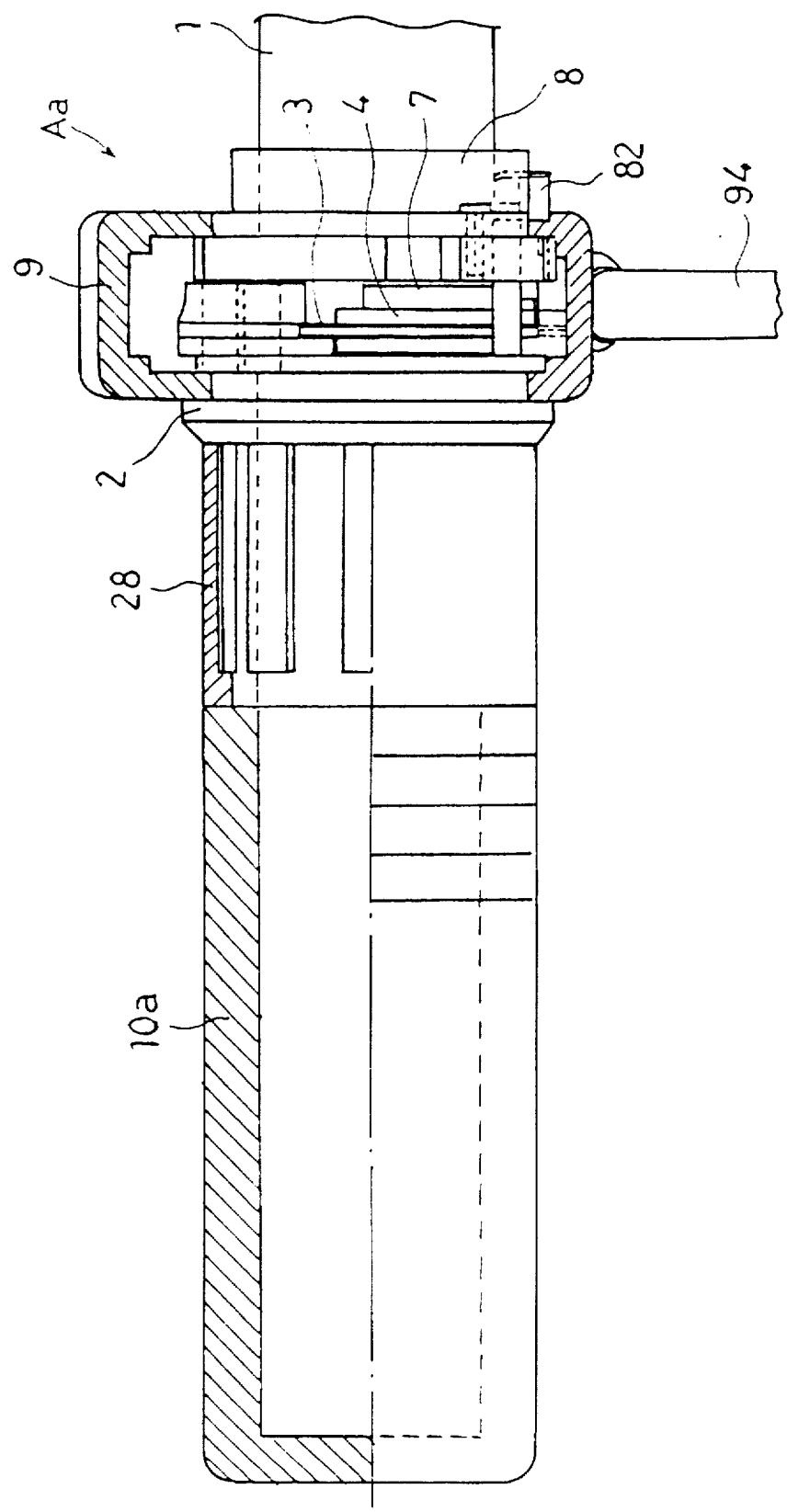
FIG. 16 illustrates principal parts as viewed in the direction of arrow I in FIG. 15, partially in cross section.

Next, a second embodiment of the present invention will be described below with reference to FIGS. 15–17. Throughout FIG. 15 and the following figures, portions similar to those of the above described first embodiment are indicated by the same references.

A bicycle speed change operation assembly Aa according to the second embodiment is provided for causing a front derailleur (not shown) of the bicycle to perform speed change operations and mounted adjacent to a left-hand grip 10a on the handlebar 1 used for carrying the already described bicycle speed change operation assembly A according to the first embodiment.

As already described with reference to FIG. 4, the front derailleur of the bicycle is provided for shifting the chain 13 among three front gears 15a–15c rotated by the crank arm 16 and includes a shifter (not shown) for pushing the chain 13 laterally (widthwise of the bicycle).

The above front derailleur is designed as a low-normal type. When the control cable C1 connected to the front derailleur is pulled toward the bicycle speed change operation assembly Aa, the derailleur performs sequentially shifting of the chain 13 from the chain wheel 15a as the first speed gear to the chain wheel 15c as the third speed gear. Conversely, when the control cable C1 is paid out from the bicycle speed change operation assembly Aa toward the front derailleur, the chain 13 is shifted in the direction opposite to the above mentioned direction. The front derailleur carries a spring (not shown) similarly to the rear derailleur. When the control cable C1 is not pulled toward the bicycle speed change operation assembly Aa, the spring force always acts on the control cable C1 so as to cause the chain 13 to be held in engagement with the diametrically smallest chain wheel 15a.

The structure of the bicycle speed change operation assembly Aa is basically similar to that of the bicycle speed change operation assembly A according to the first embodiment. Thus, the operation member 2, the first link 3, the second link 4, the spring member 6, the ball 61, the cable supporting guide 7, the fixing ring 8, the housing case 9 and the like are the same elements as those used for the first embodiment. The arrangement for attaching and assembling these elements and that of the first embodiment are laterally symmetrical and basically the same.

Therefore, in the bicycle speed change operation assembly Aa again, it is possible to cause the front derailleur to perform sequentially speed change operations one step after another by rotating the operation member 2 to pull or pay out the control cable C1. Further, in this operation, the operation angle of the operation member 2 can be large due to the principle of the link mechanism as a force-magnifying mechanism constituted by the first link 3, the second link 4 and the like. In addition, it is also possible to reduce the operation torque needed to rotate the operation member 2.

However, in the bicycle speed change operation assembly Aa, the positioning plate 5A differs constructionally from the positioning plate 5 of the above bicycle speed change operation assembly A.

Figure 17A:
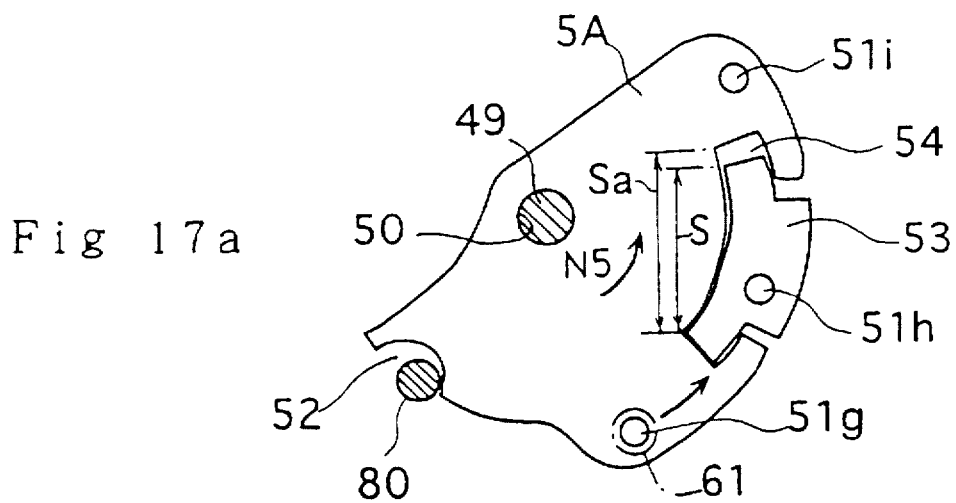
FIGS. 17a–17c illustrate a positioning mechanism in operation.

Specifically, as shown in FIG. 17a, the positioning plate 5A includes a bore 50 for insertion of a second fixed shaft 49 and a semicircular cutout 52 for insertion of a first fixed shaft 80 similarly to the positioning plate 5 illustrated in FIG. 7. However, the plate differs from the positioning plate 5 in that it has a cutout portion 54 to accommodate a movable plate 53 and three engaging bores 51g–51i.

Though the movable plate 53 has a configuration generally similar to that of the cutout portion 54, the length S of the movable plate 53 is smaller than the length Sa of the cutout 51. Thus, the movable plate 53 is capable of moving by an amount of predetermined size within the cutout 51. Of the three engaging bores 51g–51i, the engaging bore 51h is formed in the movable plate 53 and corresponds to the chain wheel 15b of the front gears. The other engaging bores 51g, 51i, which are formed in the positioning plate 5A, correspond to the chain wheels 15a, 15c of the front gears, respectively.

Figure 17B:
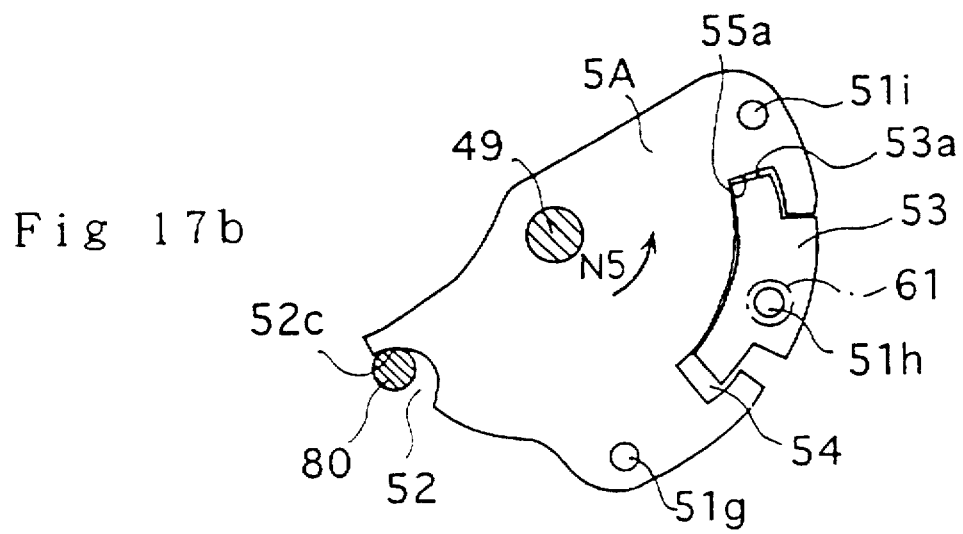

According to the positioning plate 5A having the above movable plate 53, the following operation is performed. Suppose that the speed level of the front derailleur is set at the first speed and the ball 61 retained by the second link 4 engages the engaging bore 51g. When the second link 4 is rotated in the direction of arrow N5 upon rotation of the operation member 2, the ball 61 leaves the engaging bore 51g and comes into engagement with the engaging bore 51h of the movable plate 53, as shown in FIG. 17b. With the ball 61 being retained by the engaging bore 51h, the movable plate 53 can be rotated with second link 4 in the direction of arrow N5 until the end 53a of the movable plate 53 comes into contact with an inner wall 55a of the positioning plate 5A. In this way, with the movable plate 53 held in contact with the inner wall 55a of the positioning plate 5A, it is also possible to further rotate the positioning plate 5A about the second fixed shaft 49 in the direction of arrow N5 until an end 52c of the inner surface of the cutout 52 comes into contact with the first fixed shaft 80.

Thus, the second link 4 can be additionally rotated by the total amount of the displacement of the movable plate 53 and the rotational angle of the positioning plate 5A, thereby making it possible to additionally pull the control cable C1 in an amount greater than needed to perform an intended speed change operation of the front derailleur. In this way, in performing the speed change operation from the first speed to the second speed, it is possible to perform a large amount of overshift.

In the multi-stage front gears of the bicycle, generally the chain wheel 15a as the low gear is formed to have a diameter much smaller than those of the other chain wheel 15b as the second speed and 15c as the third speed. With such front gears, it is more difficult to perform the speed change operation from the first speed to the second speed than that from the second speed to the third speed. However, it is possible to perform the speed change operation properly and reliably from the first speed to the second speed by accomplishing a large amount of overshift for the operation, as described above.

Figure 17C:
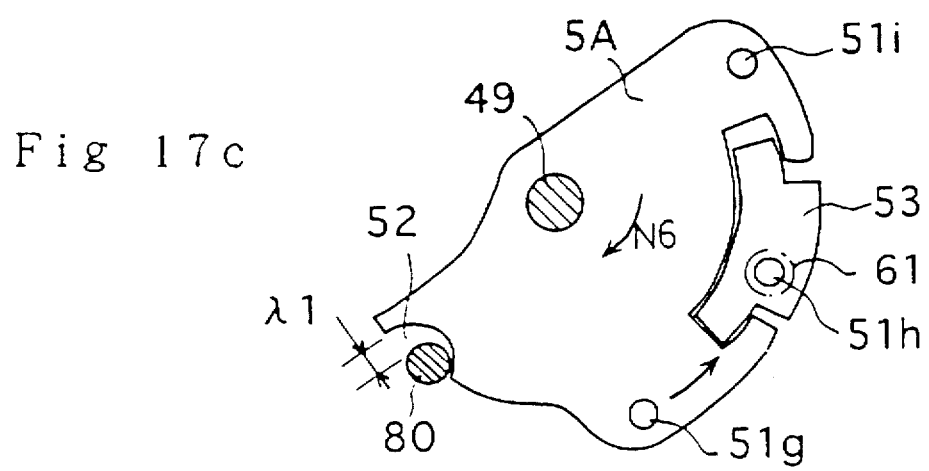

When the hand is removed from the operation grip 28 externally fitted on the operation member 2 upon completion of the speed change operation to the second speed by the front derailleur, the spring force of the front derailleur acting on the control cable C causes the movable plate 53 and the positioning plate 5A to move backward in the direction of arrow N6 and stabilize, as shown in FIG. 17c. Thus, the chain 13 is retained at a position exactly corresponding to the chain wheel 12b.

When the ball 61 engaging the engaging bore 51h is moved for engagement with the next engaging bore 51i, or in other words when the front derailleur is shifted from the second speed gear to the third speed gear, there is no need for so great an overshift as in the speed change operation from the first speed to the second speed, and the overshifting function by the movable plate 53 is not provided. However, even for the speed change operation from the second to the third speed, an appropriate overshift is obtainable since the positioning plate 5A can pivot within a range of the clearance λ1 between the cutout 52 and the first fixed shaft 80. Thus, the speed change operation is properly performed from the second to the third speed.

Next, a third embodiment of the present invention will be described with reference to FIGS. 18–28.

Figure 19:
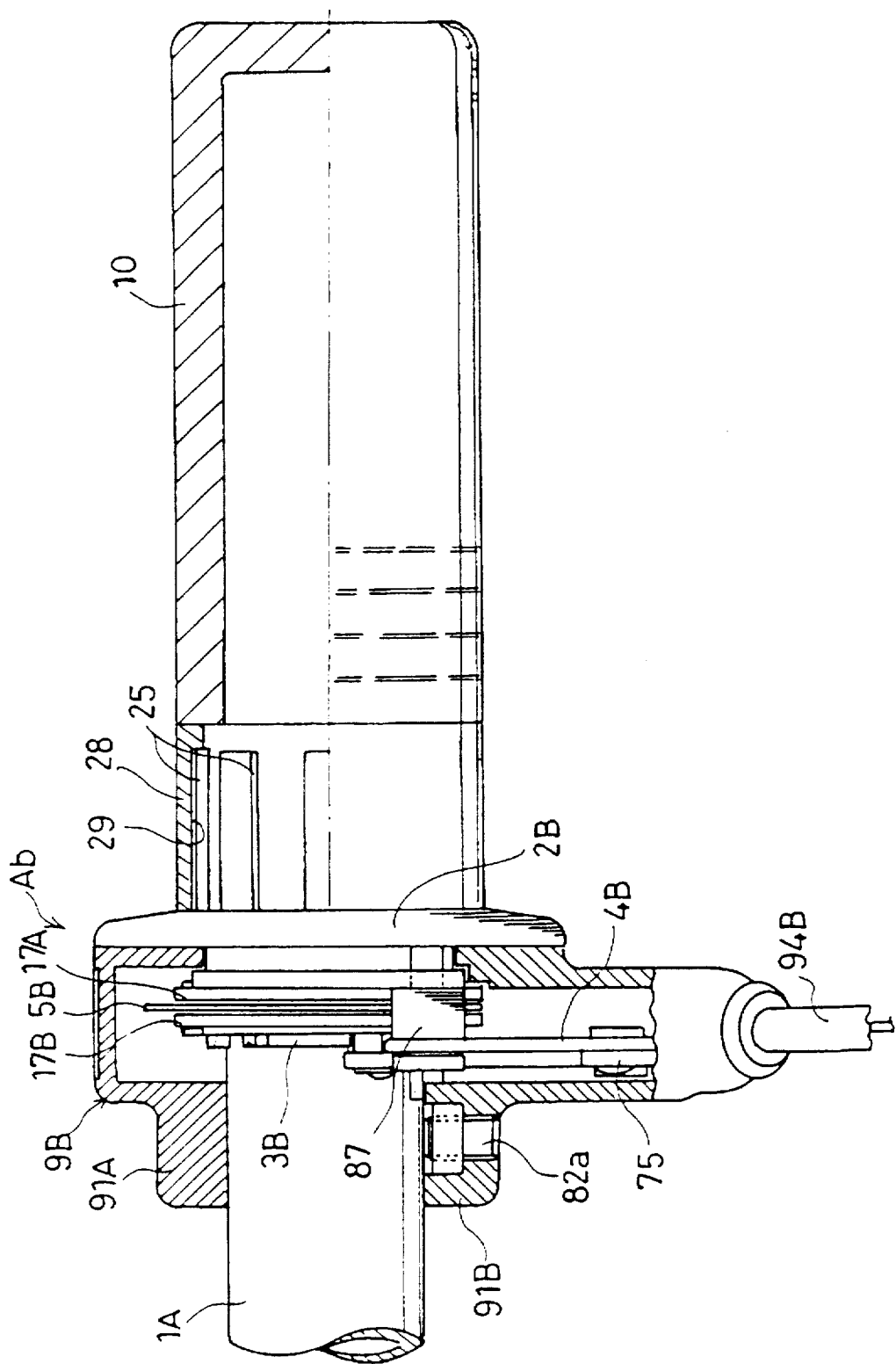
FIG. 19 illustrates principal parts as viewed in the direction of arrow II in FIG. 18, partially in cross section.
Figure 20:
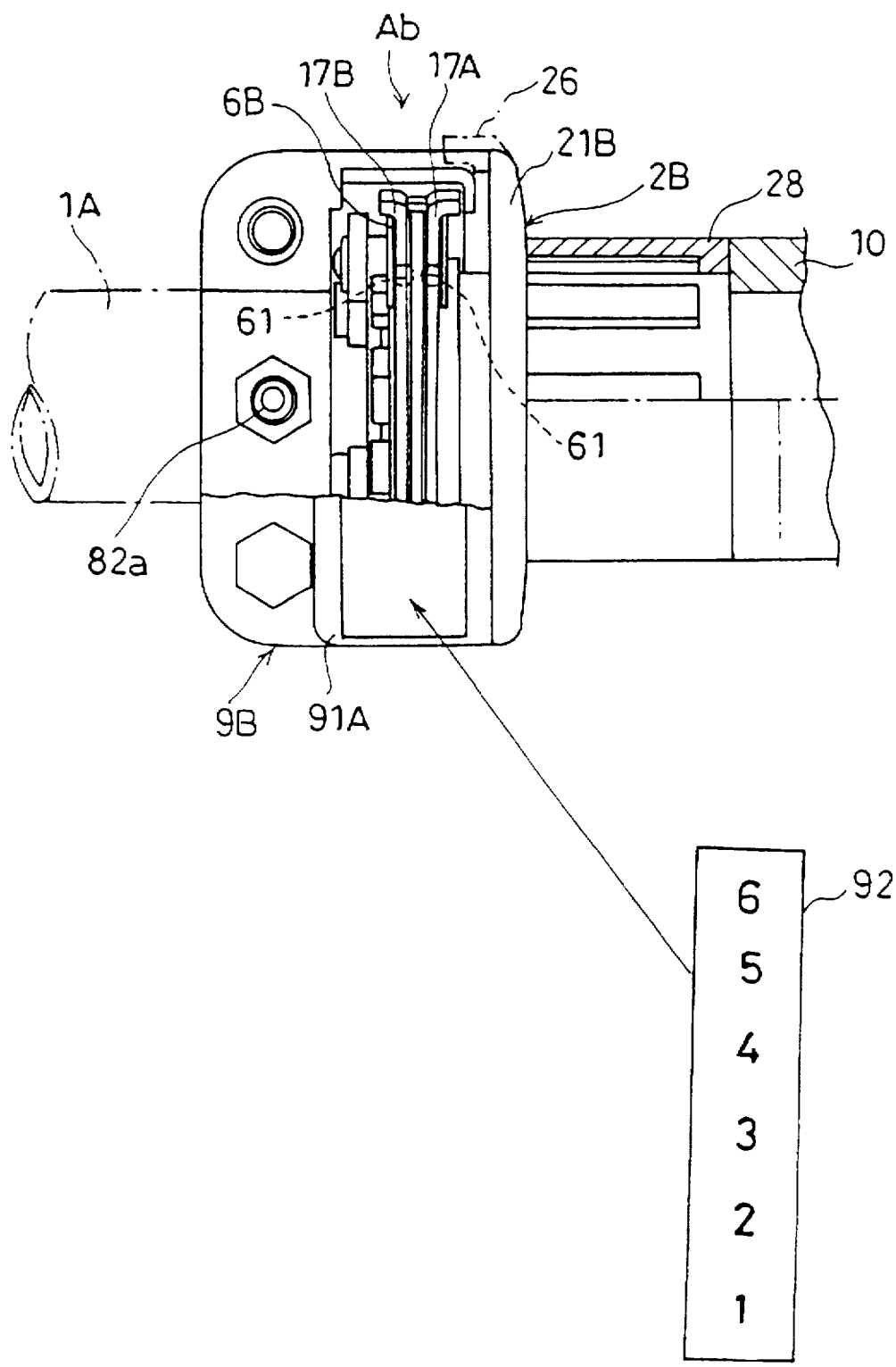
FIG. 20 is a cross sectional view showing principal parts as viewed in the direction of arrow III in FIG. 18.

Similarly to the already-described bicycle speed change operation assembly A according to the first embodiment, a bicycle speed change operation assembly Ab according to the third embodiment is provided for causing the rear derailleur to perform speed change operations by shifting the chain 13 among the six-speed rear gears 12a–12f illustrated in FIG. 4. The bicycle speed change operation assembly Ab is mounted adjacent to the right grip 10 externally fitted on the right end of the handlebar 1, as shown in FIG. 19 for example.

Figure 18:
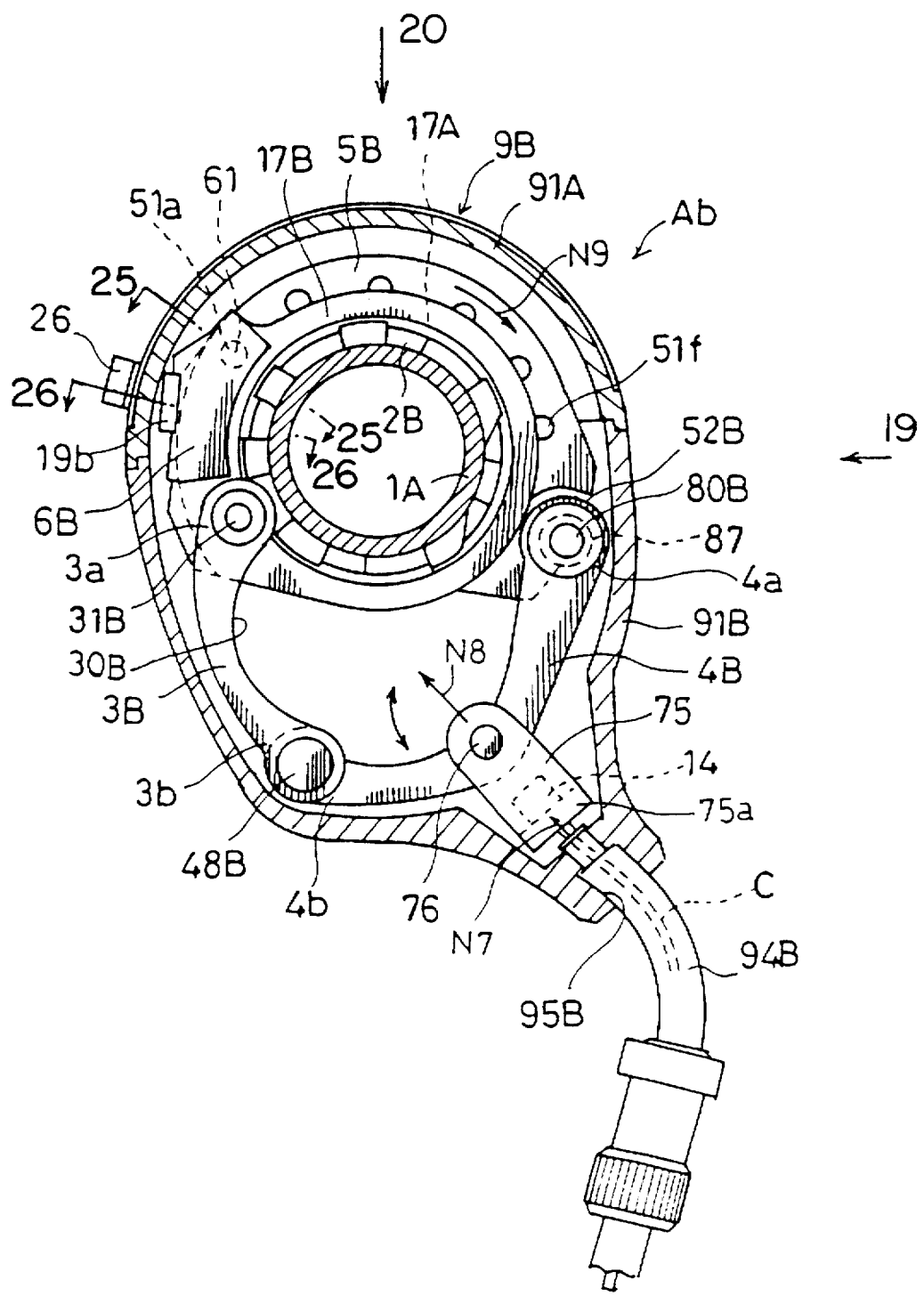
FIG. 18 is a sectional view showing another example of the bicycle speed change operation assemblies according to the present invention.

As shown in FIG. 18, the bicycle speed change operation assembly Ab includes a first link 3B and a second link 4B, and these links constitute a link mechanism enabling the pulling and paying-out of the control cable C connected to the rear derailleur. However, the specific arrangements of other elements for operating the link mechanism constituted by the first link 3B and the second link 4B are different from those of the already-described bicycle speed change operation assemblies A, Aa as follows.

Specifically, as shown in FIG. 21, in addition to the first link 3B and the second link 4B, the bicycle speed change operation assembly Ab includes an operation member 2B externally fitted on the handlebar 1A for rotational movement, two ring members 17A, 17B externally fitted on the operation member 2B, a positioning plate 5B positioned between the two ring members 17A, 17B and externally fitted on the operation member 2B, a spring member 6B for bringing the positioning plate 5B and the ring members 17A, 17B into engagement with each other via two balls 61, 61 and a housing case 9B. The housing case 9B includes an upper member 91A and a lower member 91B, which are separate.

Figure 22A:
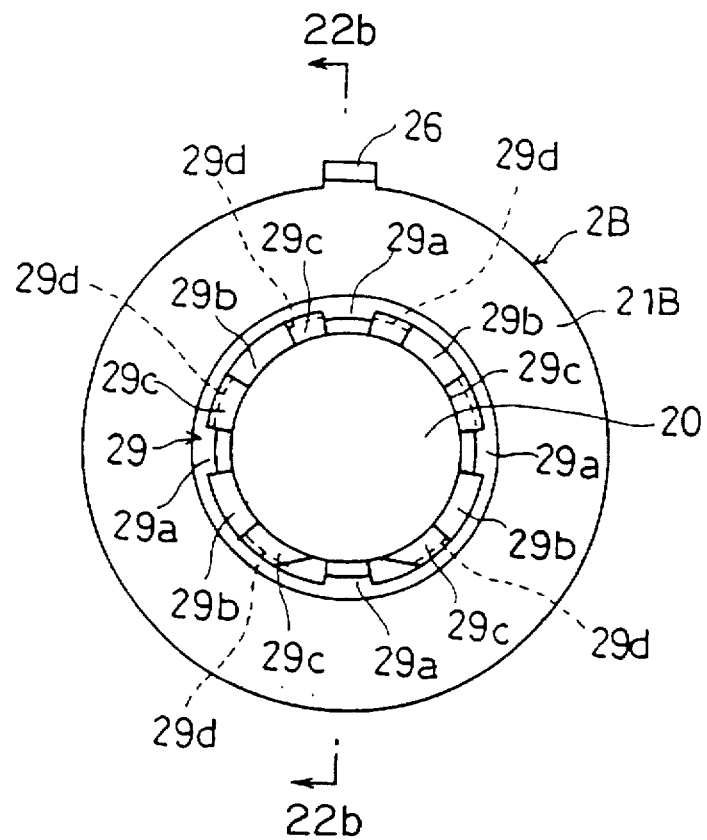
Figure 22B:
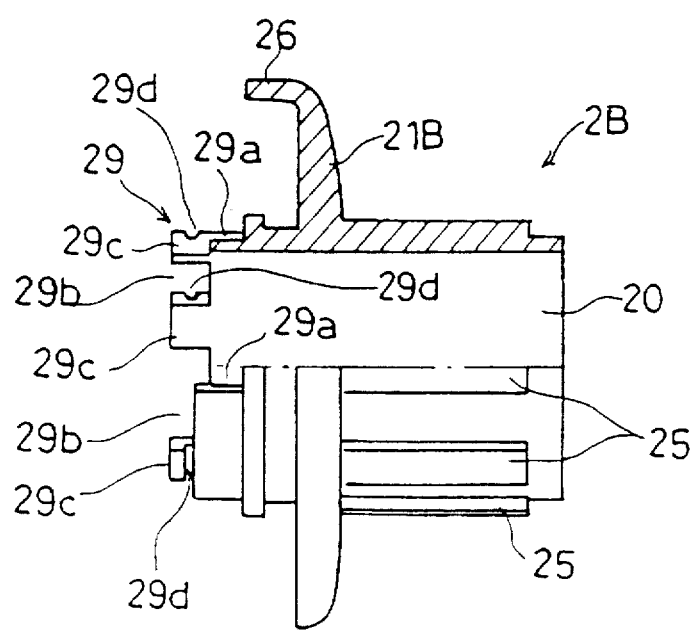
FIG. 22b is a partially sectional view of the same taken along lines X5—X5.

As shown in FIGS. 22a and 22b, the operation member 2B is generally cylindrical having a through-hole 20 and a flange 21B and can be externally fitted on the handlebar 1A of the bicycle. The operation member 2B has an outer surface formed with projections 25 for fitting into spline grooves 29 of the operation grip 28 shown in FIG. 19.

The flange 21B is formed with a projection 26 at a portion of the periphery thereof. The projection 26 is caused to move externally and circumferentially of the upper member 91A of the housing case 9B upon rotation of the operation member 2B due to the rotation of the operation grip 28 by the cyclist. The outer surface of the upper member 91A may be provided with a label 92 attached thereon which carries numbers one to six for indication of the positioning of the rear derailleur in the speed change operation. The projection 26 serves as an indicator pointing to the speed level of the rear derailleur.

The operation member 2B has a tubular portion 29 projecting in a direction from the flange 21 and includes a plurality of recesses 29a externally formed on the end of the tubular portion 29, a plurality of projections 29c intermittently formed on the end of the tubular portion 29 so that they provide clearances 29b therebetween and grooves 29d for a snap ring SR which are externally formed on the plurality of projections 29c. These elements serve to cause the positioning plate 5B and the ring members 17A, 17B to be externally retained on the operation member 2B, as described below.

Figure 23A:
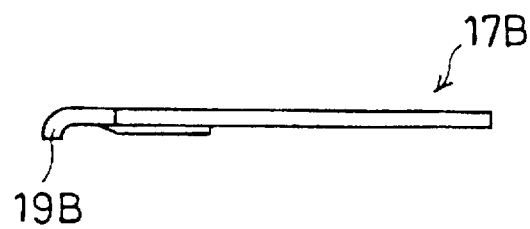
Figure 23B:
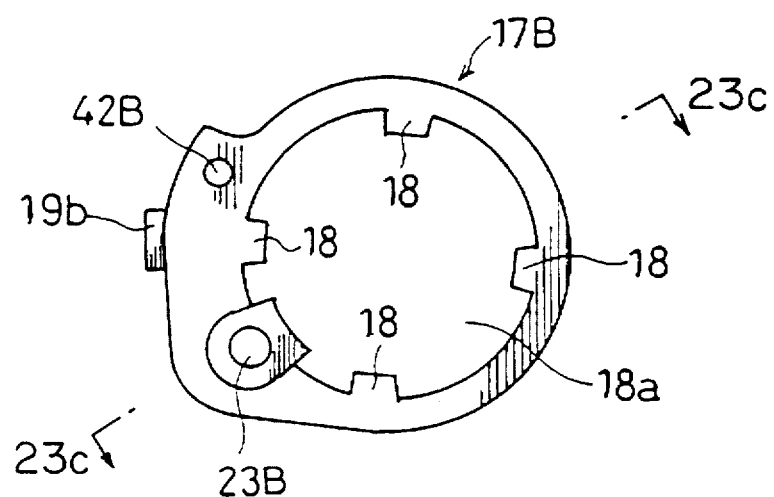
FIG. 23b is a front view of the same.
Figure 23C:
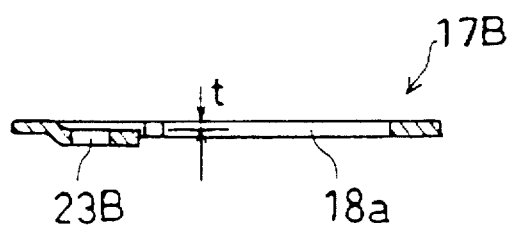
FIG. 23c is a sectional view taken along lines X6—X6.

As shown in FIGS. 23a–23c, the ring member 17B has a bore 18a for externally fitting on the tubular portion 29 of the operation member 2B. The inner edge of the bore 18a is provided with a plurality of projections 18. These projections 18 come into engagement with the recesses 29a or the clearances 29b between the projections 29c, 29c of the operation member 2B when the ring member 17B is externally fitted on the tubular portion 29 of the operation member 2B. Thus, the ring member 17B is prevented from rotating relatively to the operation member 2B. The ring member 17B is externally fitted on the operation member 2B for rotation with the operation member 2B.

The ring member 17B further includes a bore 42B for receiving the ball 61, a projection 19b for engagement with the spring member 6B, a bore 23B for fixation of a pin 31B supporting the first end 3a of the first link 3B as shown in FIG. 21 and the like. As shown in FIG. 23c, of portions of the ring member 17B, the portion at the location of the bore 23B is formed offset from the other portions by a predetermined amount t. With such an arrangement, an end of the pin 31B inserted through the bore 23B can be caulked within a range of the amount t.

As shown in FIG. 21, the other ring member 17A has a structure basically similar to that of the ring member 17B, thereby requiring no detailed description. However, the ring member 17A does not include a bore 23B for connecting the first link 3B. Further, the projection 19a for engaging the spring member 6B is bent in an opposite direction to the projection 19b of the ring member 17B.

Figure 24A:
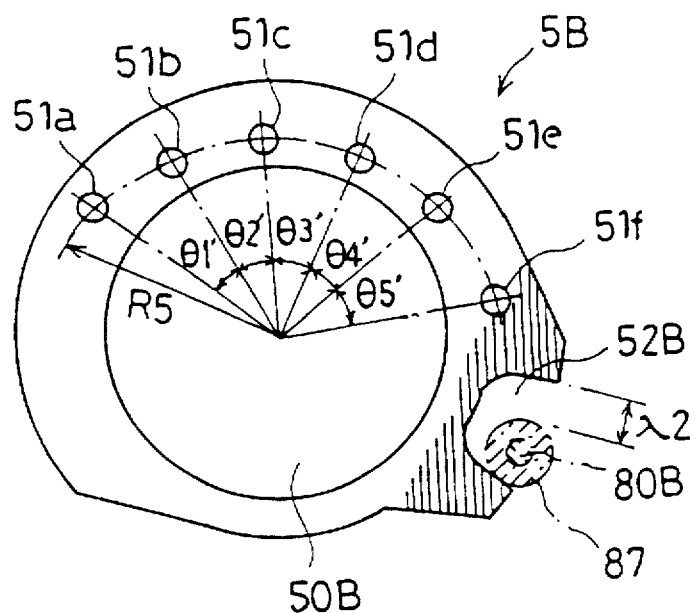
Figure 24B:
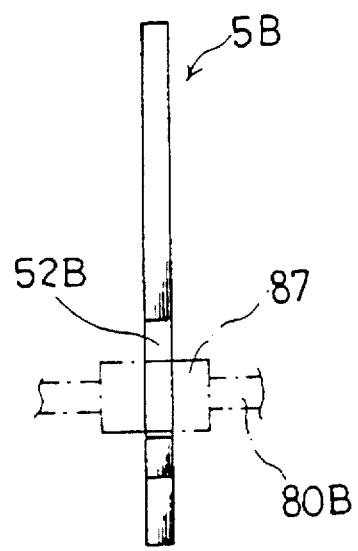
FIG. 24b illustrates the right side of the same.

As shown in FIGS. 24a, 24b, the positioning plate 5B has a bore 50B for external fitting on the tubular portion 29 of the operation member 2B. The positioning plate 5B is formed with six engaging bores 51a–51f located along a circle having a predetermined radius R5. The engaging bores 51a–51f are provided for bringing the ball 61 into engagement therewith like the engaging bores 51a–51f of the positioning plate 5 illustrated in FIG. 7.

The positioning plate 5B differs from the two ring members 17A, 17B in that it does not engage the operation member 2B nor rotate with the operation member 2B. A fixed shaft 80B attached to the lower member 91B of the housing case 9B and a sleeve 87 externally fitted on the fixed shaft 80B are arranged within the cutout 52B of the positioning plate 5B to prevent the positioning plate 5B from pivoting due to coming into engagement with the sleeve 87.

However, the outside diameter of the sleeve 87 is smaller than the width of the cutout 52B, thereby providing a clearance λ2 therebetween. Thus, the positioning plate 5B can pivot slightly about the operation member 2B within a range of the clearance λ2. When the positioning plate 5B for engaging the ball 61 is capable of pivoting by a small angle, it is possible to provide an overshift movement when the rear derailleur performs a speed change operation, similarly to the bicycle speed change operation assembly A using the positioning plate 5 illustrated in FIG. 7.

Figure 25:
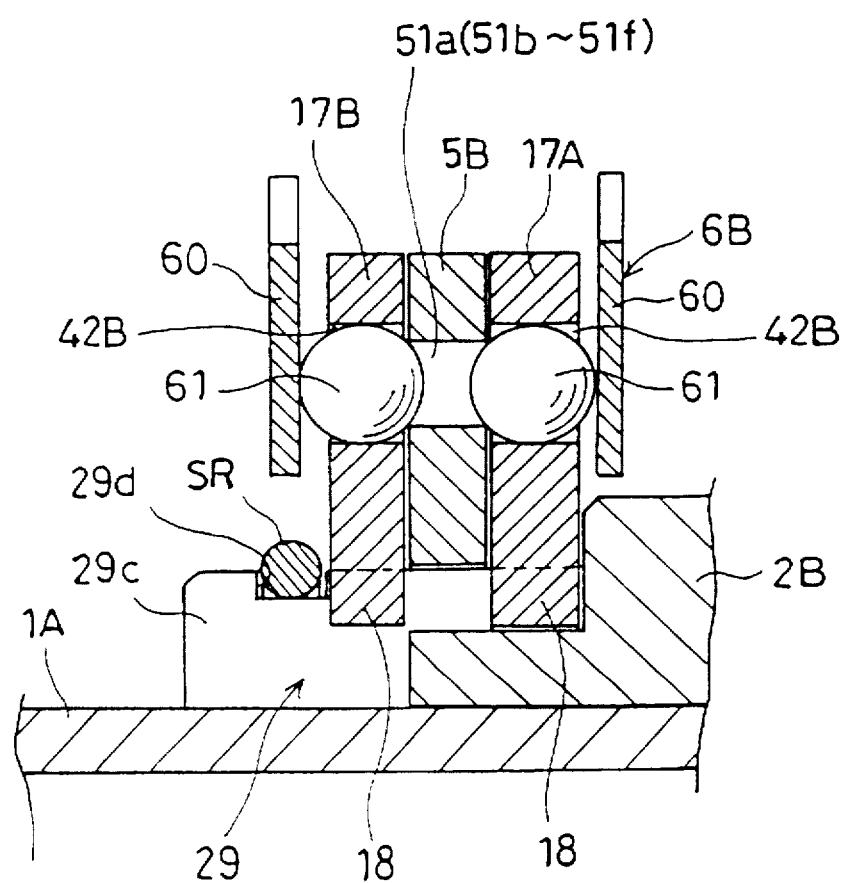
FIG. 25 is an enlarged sectional view of principal parts taken along lines X7—X7 in FIG. 18.

As shown in FIG. 25, the two ring members 17A, 17B, the positioning plate 5B, the spring member 6B and the balls 61, 61 constitute a positioning mechanism. In the positioning mechanism, the positioning plate 5B and the two ring members 17A, 17B allowing insertion of the positioning plate 5B therebetween are externally fitted on the tubular portion 29 of the operation member 2B. A snap ring SR is brought into fixed engagement with a groove 29d formed in the outer surface of the plurality of projections 29c of the operation member 2B, thereby causing the positioning plate 5B and the two ring members 17A, 17B to be positionally retained longitudinally of the operation member 2B. The bores 42B, 42B of the two ring members 17A, 17B accommodate the balls 61, 61 fitted therein. The balls 61, 61 are urged in an approaching direction to each other by a pair of opposite pieces 60, 60 of the spring member 6B so that they are received in one of the engaging bores 51a–51f of the positioning plate 5B. As a result, in the positioning mechanism, when the operation member 2B rotates, though the positioning plate 5B does not rotate therewith, the two ring members 17A, 17B, the spring member 6B and the balls 61, 61 rotate with the operation member 2B.

Specifically, when the operation member 2B is rotated while the balls 61, 61 are held in engagement with the engaging bore 51a, the balls 61, 61 retained by the ring members 17A, 17B rotating with the operation member 2B can be moved out of the engaging bore 51a. Thereafter, the balls 61, 61 may be brought into engagement with the next engaging bore 51b. Similarly, the balls 61, 61 may be sequentially brought into engagement with one of the other engaging bores 51c–51f after another.

Figure 26:
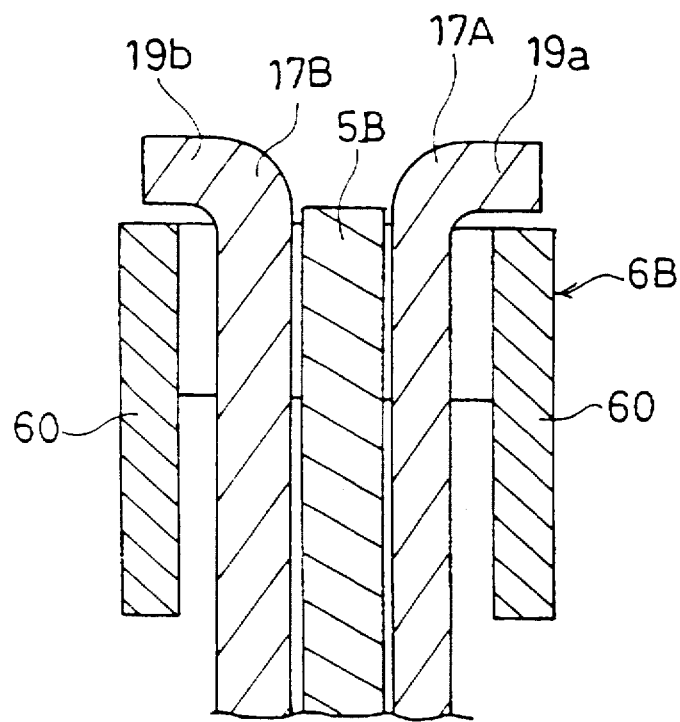
FIG. 26 is an enlarged sectional view of principal parts taken along lines X8—X8 in FIG. 18.

As shown in FIG. 26, the pair of opposite pieces 60, 60 of the spring member 6B are arranged to come into engagement with the projections 19a, 19b formed on the peripheries of the two ring members 17A, 17B. Thus, the spring member 6B is retained by the two ring members 17A, 17B in engagement therewith for prevention of coming off the ring members 17A, 17B.

As shown in FIGS. 18 and 21, the first link 3B is connected to the ring member 17B for rotational movement by arranging the pin 31B extending through the throughhole 30a in the first end 3a and the bore 23B of the ring member 17B. Thus, upon rotation of the ring members 17A, 17B due to the rotating of the operation member 2B, the first end 3a of the first link 3B is moved around the handlebar 1A with the rotation of the ring member 17B.

Figure 27:
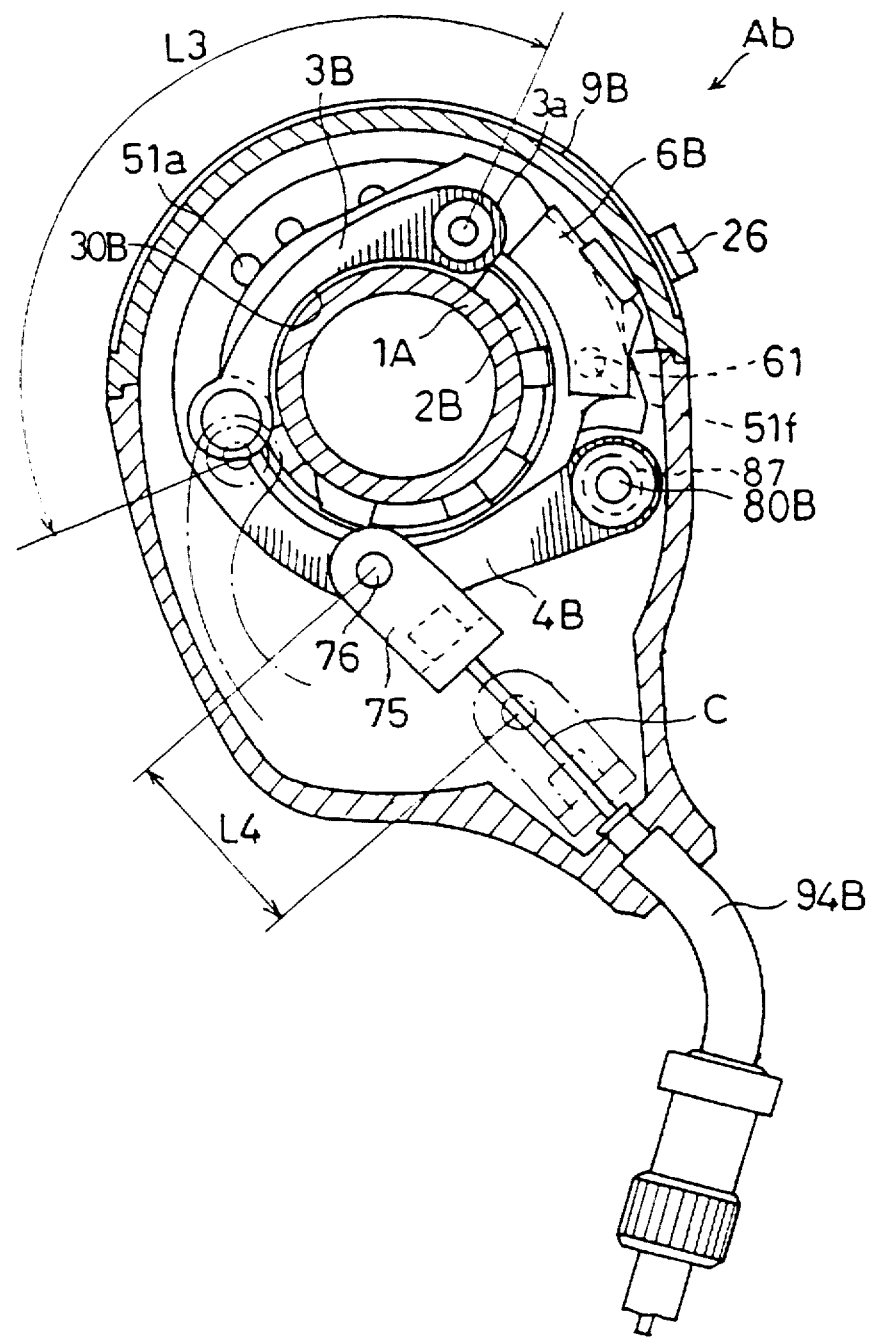
FIG. 27 is a sectional view illustrating the bicycle speed change operation assembly shown in FIG. 18 in operation.

The first link 3B is made in a curved configuration having a concave surface 30 whose radius of curvature Rb is equal or generally equal to the radius of the handlebar 1A. Thus, in rotating the operation member 2B as shown in FIG. 27, the first link 3B can come into fitting engagement with the outer surface of the handlebar 1A, thereby providing an increased maximum rotational angle of the operation member 2 while preventing the bulging of the first link 3B.

As shown in FIGS. 18 and 21, the through-hole 40a formed at the first end 4a of the second link 4B receives an end of the sleeve 87 externally fitted on the fixed shaft 80B. Thus, the second link 4B is vertically pivotable about the fixed shaft 80B and the sleeve 87. On the other hand, the through-hole 40b at the second end 4b of the second link 4B and the through-hole 30b at the second end 3b of the first link 3B receive the connecting pin 48B extending therethrough. Thus, the second end 4b of the second link 4B and the second end 3b of the first link 3B are connected for relative pivotal movement.

As shown in FIG. 18, the second link 4B is located below the handlebar 1A of the bicycle. The first link 3B is arranged to extend generally vertically as viewed longitudinally of the first link 3B, when the control cable C is not pulled at all or pulled by a small amount. Thus, the second link 4B and the first link 3B are prevented from unduly bulging from the handlebar 1A forward or backward of the bicycle. Therefore, the width of the bicycle speed change operation assembly Ab as a whole can be reduced and give a neater appearance.

A bracket piece 75 is pivotally connected via a pin 76 to a generally longitudinal center of the second link 4B. The bracket piece 75 has a bottom plate 75a formed with a bore 75b for insertion of the control cable C, and a nipple 14 provided at the end of the cable is retained by the bottom plate 75a. Thus, the control cable C is pulled or paid out by the second link 4B when the link 4B pivots about the fixed shaft 80B or the sleeve 87.

The direction N7 in which the control cable C is pulled from the upper end of the cable guide 94B generally coincides with the pivotal direction N8 of the pin 76 of the second link 4B. Therefore, the second link 4B pulls the control cable C along a straight path from the upper end of the cable guide 94B. The control cable C is not drawn out in a curved path which sways vertically or horizontally.

As shown in FIG. 21, the upper member 91A and the lower member 91B of the housing case 9B have clamp portions 98a, 98b for clamping the handlebar 1A from above and below. The clamp portions 98a, 98b are bolted to each other by a bolt 91b and a nut 91c to fix the housing case 9B on the handlebar 1A. A set screw 82a is threaded through the lower member 91B. The set screw 82a is brought into pressing contact with the outer surface of the handlebar 1A, thereby preventing the housing case 9B from unduly rotating around the handlebar.

The lower member 91B further includes a through-hole 95B for insertion and retainment of the upper end of the cable guide 94B for the control cable C and a bore 85B for attaching the fixed shaft 80B.

In the bicycle speed change operation assembly Ab having the above arrangement, when the operation member 2B is rotated in the direction of N9 shown in FIG. 18 to the angular position shown in FIG. 27, the first end 3a of the first link 3B is moved around the handlebar 1A by a predetermined length L3 with the rotation of the operation member 2B. Then, the second link 4B pivots upward about the fixed shaft 80B or the sleeve 87 with the movement of the first link 3B. As a result, the bracket piece 75 connected to the second link 4B is lifted to pull the control cable C.

The first link 3B and the second link 4B constitute a force-magnifying mechanism or reduction mechanism similar to the link mechanism described with reference to FIG. 12. Therefore, the displacement of any portion of the second link 4B is rendered smaller than the displacement L3 of the first end 3a of the first link 3B, and the pulling amount L4 of the control cable C is considerably smaller than the displacement L3 of the first end 3a of the first link 3B. As a result, again in the speed change operation assembly Ab, it is possible to reliably cause the rear derailleur to sequentially perform a speed change operation after another by a large amount of rotational operation of the operation grip 28 externally fitted on the operation member 2B. It is also possible to reduce the operation torque needed to rotate the operation member 2B.

Since the control cable C pulled by the second link 4B follows a straight or generally straight path from the upper end of the cable guide 94B, there is no need for additional members such as the cable supporting guide 7 for guiding the control cable C, unlike the already-described bicycle speed change operation assembly A. Thus, reduction in the number of elements can be accomplished. Further, since frictional resistance generated on the control cable C in pulling the control cable C can be further decreased, the speed change operation can be improved more.

On the other hand, in sequentially rotating the operation member 2B, the balls 61, 61 retained by the two ring members 17A, 17B are moved relative to the positioning plate 5B. During the movement after leaving the engaging bore 51a of the positioning plate 5B, each ball 61 is sequentially brought into and out of engagement with the respective engaging bores 51b–51f. According to the above positioning mechanism where each ball 61 engages one of the engaging bores 51a–51f, the two ring members 17A, 17B and consequently the operation member 2B can be retained at an intended angular position, thereby retaining the rear derailleur at an intended speed level.

Further, again the positioning mechanism adopted in the bicycle speed change operation assembly Ab can perform an overshift operation as described below.

Figure 28A:
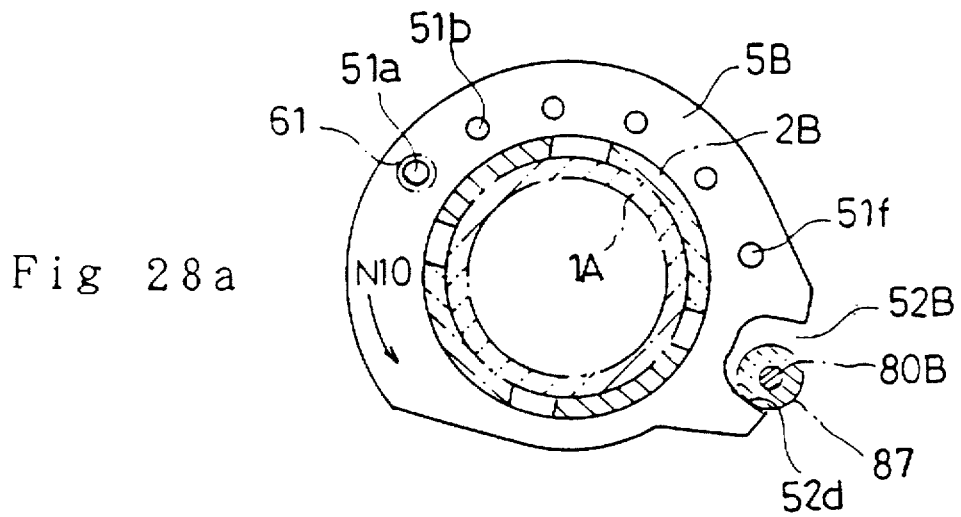
FIGS. 28a–28c illustrate a positioning mechanism in operation.

Specifically, the rear derailleur always provides a spring force urging the control cable C toward the rear derailleur. Thus, when the cyclist keeps his hand off the operation grip 28, the spring force acts on the positioning plate 5B as a rotating force in the direction of arrow N10, as shown in FIG. 28a for example. Thus, the positioning plate 5B is stabilized with the end 52d of the inner surface of the cutout 52B contacting with the sleeve 87. The ball 61 engages the engaging bore 51a for example, thereby properly retaining the rear derailleur for the sixth speed.

Figure 28B:
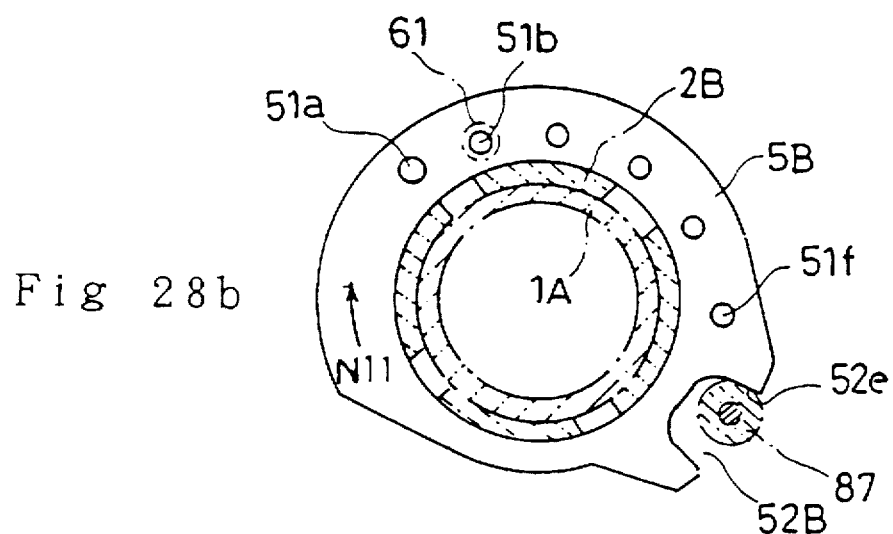

Then, as shown in FIG. 28b, when rotating the operation member 2B in the direction of arrow N11, the ball 61 leaves the engaging bore 51a and then fitts in the next engaging bore 51b. However, even thereafter, it is possible to additionally rotate the positioning plate 5B and the operation member 2B by a small angle, until the other end 52e of the inner surface of the cutout 52B comes into contact with the sleeve 87. Thus, the control cable C can be additionally pulled more than needed for the speed change operation of the rear derailleur i.e., by an amount of the extra rotation angle of the positioning plate 5B.

Figure 28C:
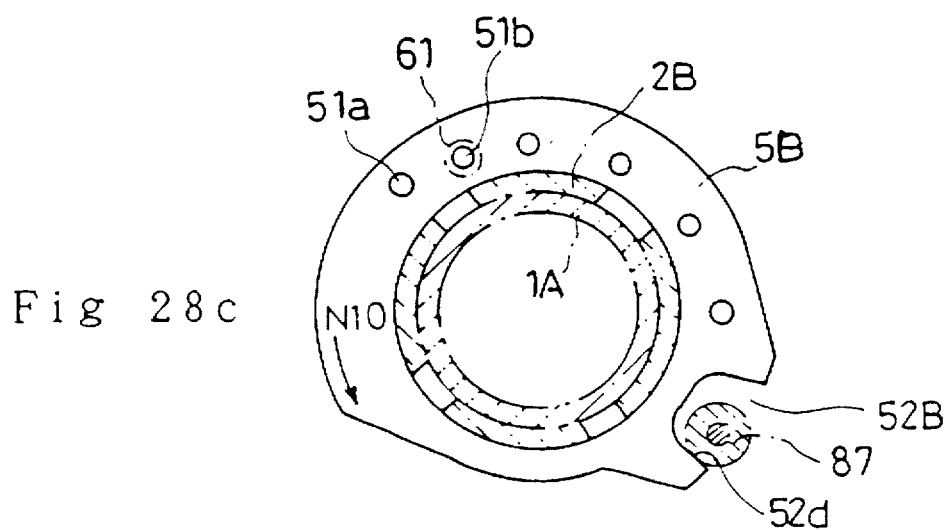

Thereafter, when the cyclist removes his hand off the operation grip 28, the rear derailleur spring force acting on the control cable C causes the positioning plate 5B to slightly rotate back in the direction of arrow N10 as shown in FIG. 28c and to be stabilized due to the end 52d of the inner surface of the cutout 52B coming into contact with the sleeve 87. In this way, with the bicycle speed change operation assembly Ab as well, an overshifting of the rear derailleur can be performed to provide a reliable speed change performance by the rear derailleur.

In the link mechanism of the bicycle speed change operation assembly Ab, similarly to the already-described link mechanisms of the bicycle speed change operation assemblies A, Aa, the displacement of the first end 3a of the first link 3B and the displacement of the second link 4B are not proportional. With the link mechanism of the bicycle speed change operation assembly Ab, the operation member 2B can be arranged to require a larger rotational angle to pull a constant length of the control cable C, as the operation member 2B is rotated further into the direction of arrow N9 as shown in FIG. 18. For this, the angles θ1'–θ5' between the engaging bores 51a–51f of the positioning plate 5B shown in FIG. 24 may unequally formed such that θ2'–θ5' may be determined to satisfy θ2'<θ3'<θ4'<θ5'.

In this way, by increasing the rotation angles for the operation member 2B to pull a constant length of the control cable C, the operation torque for rotating the operation member 2B can be reduced accordingly. As a result, even if the rear derailleur spring force working as resistance in pulling the control cable C increases as the speed is reduced by shifting the rear derailleur from the fifth speed to the first speed, the magnifying ratio of the rotation torque of the operation member 2B is increased accordingly, thereby equalizing the operation torque needed to rotate the operation member 2B as a whole.

Figure 29:
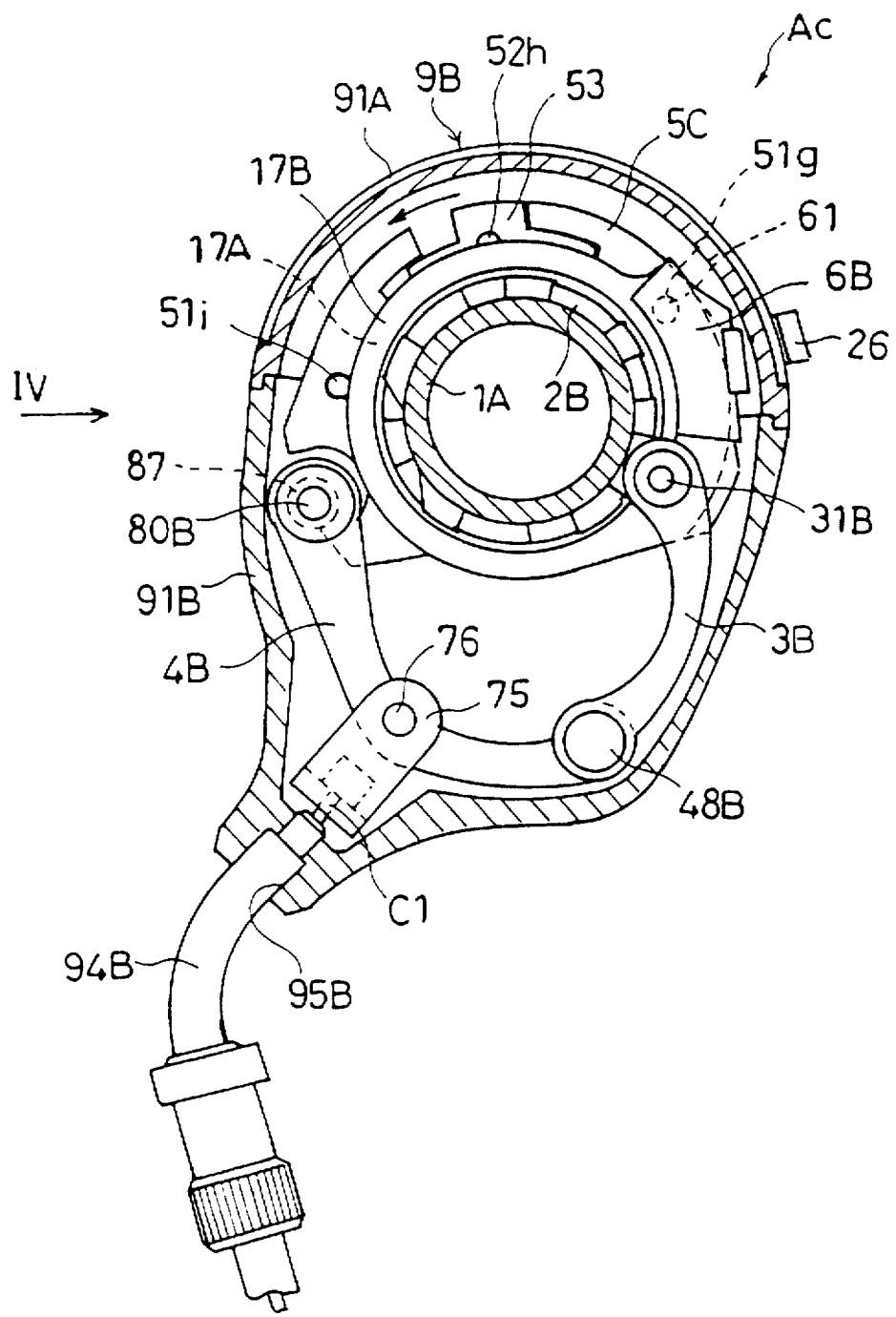
FIG. 29 is a sectional view showing another example of the bicycle speed change operation assemblies according to the present invention.
Figure 30:
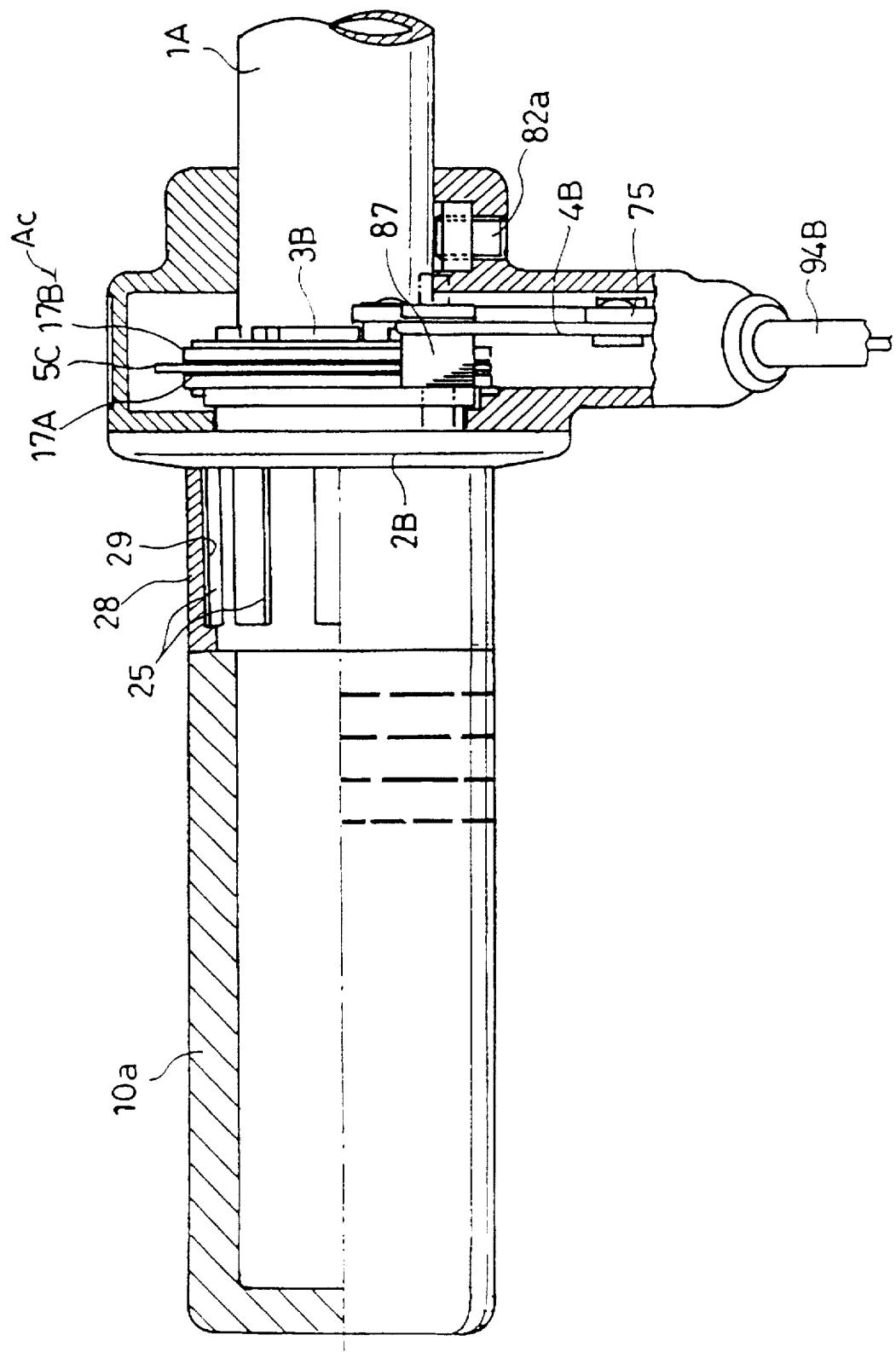
FIG. 30 is a partially sectional view showing principal parts as viewed in the direction of arrow IV in FIG. 29.

Next, a fourth embodiment of the present invention will be described with reference to FIGS. 29–31.

A bicycle speed change operation assembly Ac according to the fourth embodiment is provided for causing the front derailleur shifting the chain 13 among the three-speed front gears 15a–15c illustrated in FIG. 4 to perform speed change operations. The bicycle speed change operation assembly Ac is mounted adjacent to the left grip 10a of the handlebar 1A carrying the bicycle speed change operation assembly Ab according to the third embodiment already described.

The arrangement of the bicycle speed change operation assembly Ac is basically similar to that of the bicycle speed change operation assembly Ab according to the third embodiment. The operation member 2B and others such as the first link 3B, the second link 4B, the two ring members 17A, 17B, the spring member 6B, the ball 61 and the housing case 9B are the same as those of the third embodiment.

Thus, again in the bicycle speed change operation assembly Ac, the pulling and paying-out of the control cable C1 are performed by rotating the operation member 2B to cause the front derailleur to sequentially perform a step-by-step speed change operation. Simultaneously, the link mechanism as a force-magnifying mechanism constituted by the first link 3B and the second link 4B makes it possible to rotate the operation member 2B by a large rotational angle, while the operation torque needed to rotate the operation member 2B can be reduced. Apparently, the speed change operation can be facilitated without generating a large frictional force on the control cable C1.

However, in the bicycle speed change operation assembly Ac, the positioning plate 5c engaging the balls 61, 61 retained by the two ring members 17A, 17B is different from the positioning plate 5B of the above bicycle speed change operation assembly Ab.

Figure 31A:
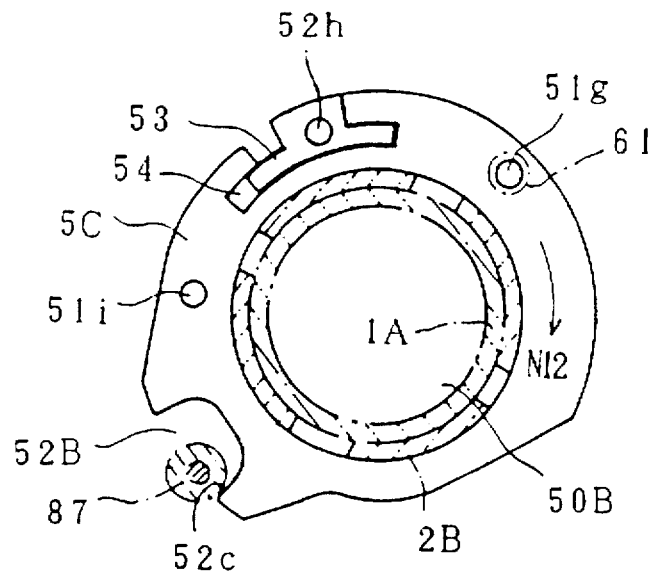
FIGS. 31a–31c illustrate a positioning mechanism in operation.

Specifically, as shown in FIG. 31a, the positioning plate 5C includes a bore 50B for externally fitting on the operation member 2B and a cutout 52B for inserting the sleeve 87 externally fitted around the fixed shaft 80B. However, the illustrated positioning plate is different from the already-described positioning plate 5B in that it has a cutout portion 54 for accommodating a movable plate 53 and three engaging bores 51g–51i. The movable plate 53 and the cutout portion 54 are similar to the movable plate 53 and the cutout portion 54 described with reference to FIG. 17.

Figure 31B:
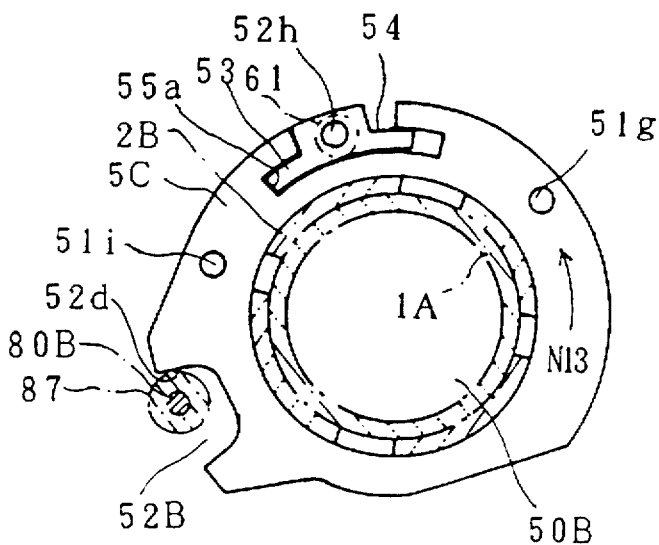

In the positioning mechanism including the positioning plate 5C, an overshifting function similar to that by the positioning plate 5A described with reference to FIG. 17 is obtainable as described below. Specifically, suppose that the speed level of the front derailleur is set for the first speed wherein the ball 61 retained by the second link 4B engages the engaging bore 51g. Upon rotation of the ring members 17A, 17B in the direction of arrow N12 by rotating the operation member 2B, the ball 61 leaves the engaging bore 51g and then comes into engagement with the engaging bore 51h of the movable plate 53, as shown in FIG. 31b. With the ball 61 engaging the engaging bore 51h, the operation member 2B can be rotated in the direction of arrow N13 until an end 53 of the movable plate 53 comes into contact with an inner end wall 55a of the positioning plate 5C. Further, with the movable plate 53 held in contact with the inner end wall 55a of the positioning plate 5C, the operation member 2B can be further rotated in the direction of arrow N13 until an end 52d of the inner surface of the cutout 53B comes into contact with the sleeve 87.

As a result, it is possible to additionally rotate the operation member 2B by a total amount of the displaced angle of the movable plate 53 and the rotational angle of the positioning plate 5C, thereby pulling the control cable C1 by an amount greater than needed for performing an intended speed change. In other words, a large amount of overshift can be provided in performing the speed change from the first speed to the second speed. As already described, in multistage front gears of the bicycle, generally the speed change from the first speed to the second speed is more difficult than that from the second speed to the third speed. Therefore, when a large amount of overshift is possible for performing the speed change from the first speed to the second speed, the speed change operation can be performed properly and reliably.

Figure 31C:
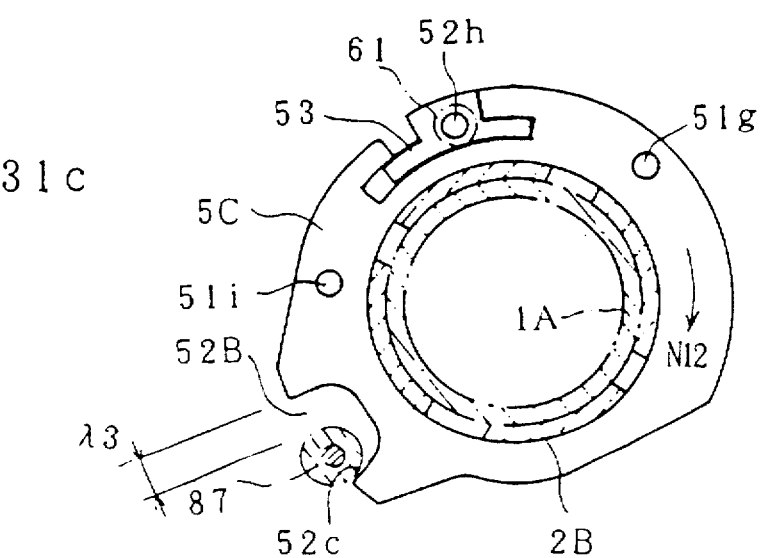

When the cyclist removes his hand from the operation grip 28 externally fitted on the operation member 2B upon completion of the shifting to the second speed, the movable plate and the positioning plate 5C are moved backward in the direction of arrow N12 as shown in FIG. 31c due to the tension of the control cable C1 and comes into a stabilized condition. Thus, the chain 13 is retained at a position exactly corresponding to the chain wheel 12b.

In shifting the ball 61 engaging the engaging bore 51h to the next engaging bore 51i for engagement therewith, an overshifting function due to the displacement of the movable plate 53 is not obtainable. However, in such an instance, an overshift can be provided in a moderate amount, since the positioning plate 5C can pivot within a range of a clearance λ3 defined between the cutout 52B and the sleeve 87, thereby facilitating the speed change operation from the second speed to the third speed.

Next, a fifth embodiment of the present invention will be described with reference to FIGS. 32–40.

Figure 32:
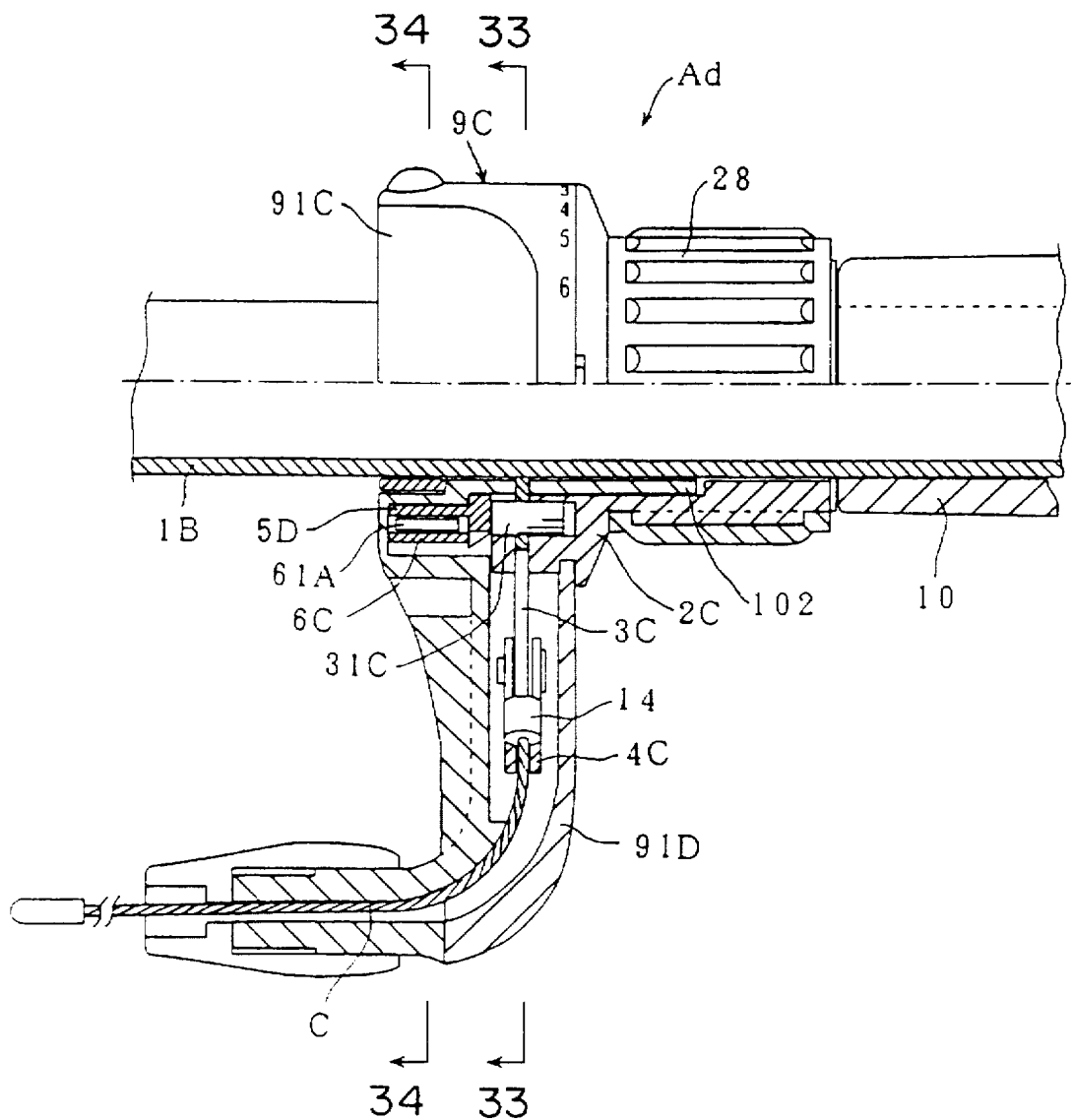
FIG. 32 is a partially sectional view showing another example of the bicycle speed change operation assemblies according to the present invention.

A bicycle speed change operation assembly Ad according to the fifth embodiment is provided for causing the rear derailleur shifting the chain 13 among the six-speed rear gears 12a–12f described with reference to FIG. 4 to perform a speed change operation, similarly to the already described bicycle speed change operation assemblies A, Ab according to the first and the third embodiments, respectively. The bicycle speed change operation assembly Ad is mounted adjacent to the right grip 10 externally fitted around the right end of the handlebar 1B as shown in FIG. 32 for example.

Figure 33:
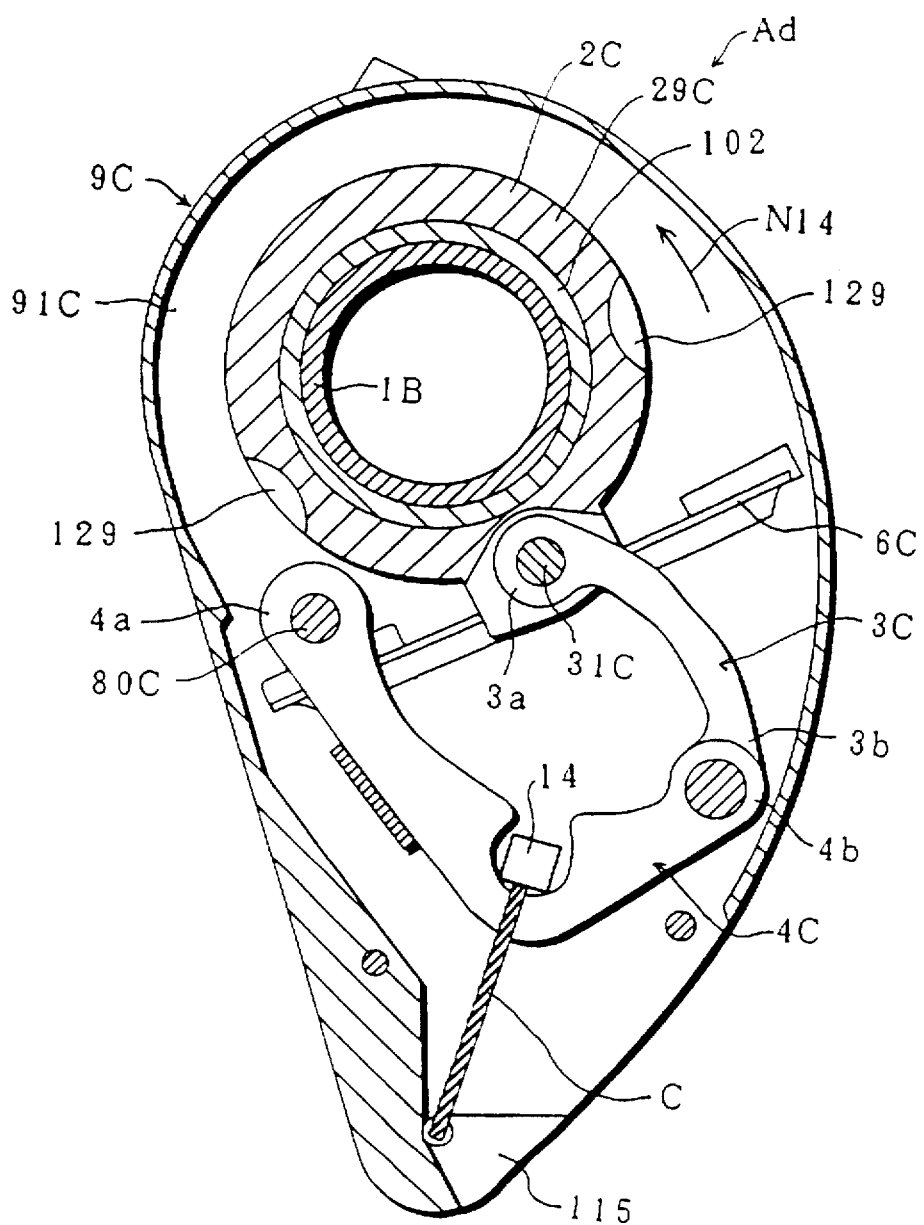
FIG. 33 is a sectional view taken along lines X9—X9 in FIG. 32.

As shown in FIG. 33, the bicycle speed change operation assembly Ad includes a first link 3C and a second link 4C which constitute a link mechanism performing the pulling and paying-out of the control cable C connected to the rear derailleur. However, specific arrangements of portions for operating the link mechanism constituted by the first link 3C and the second link 4C are different from those of the already described bicycle speed change operation assemblies A, Ab as follows.

Figure 35:
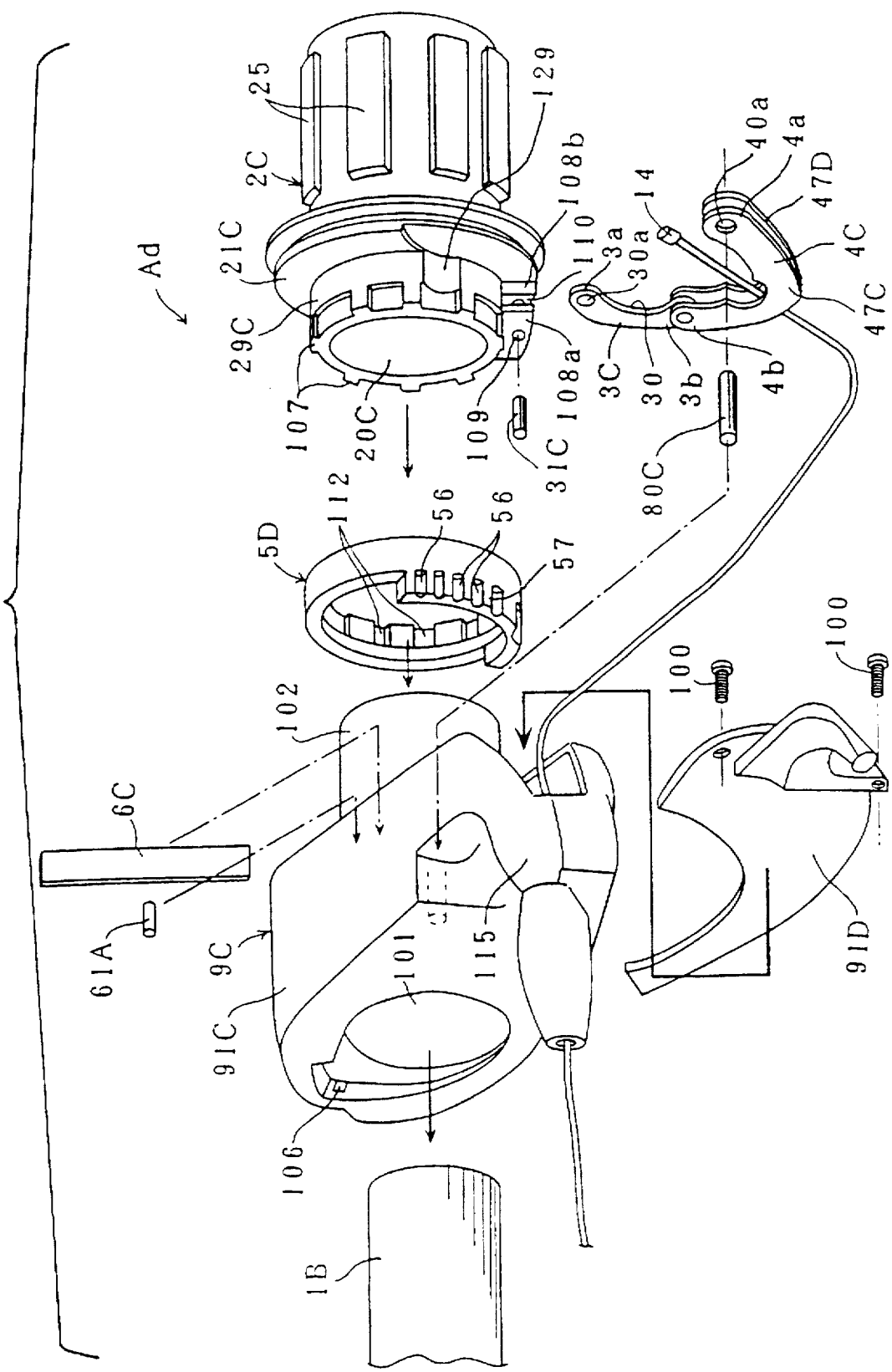
FIG. 35 is an exploded perspective view showing the bicycle speed change operation assembly shown in FIG. 32.

Specifically, as shown in FIG. 35, in addition to the first link 3C and the second link 4C, the bicycle speed change operation assembly Ad includes an operation member 2C externally fitted on a handlebar 1B for pivotal movement, a positioning ring 5D engaging the operation member 2C, a roller 61A as an engaging member, a plate-like spring member 6C and a housing case 9C accommodating these members.

The housing case 9C includes a case body 91C and a cover 91D, which are separate. The cover 91D is releasably attached to the case body 91C via screws 100. The respective members of the bicycle speed change operation assembly Ad are put together in a state where the cover 91D is removed from the case body 91C.

Figure 34:
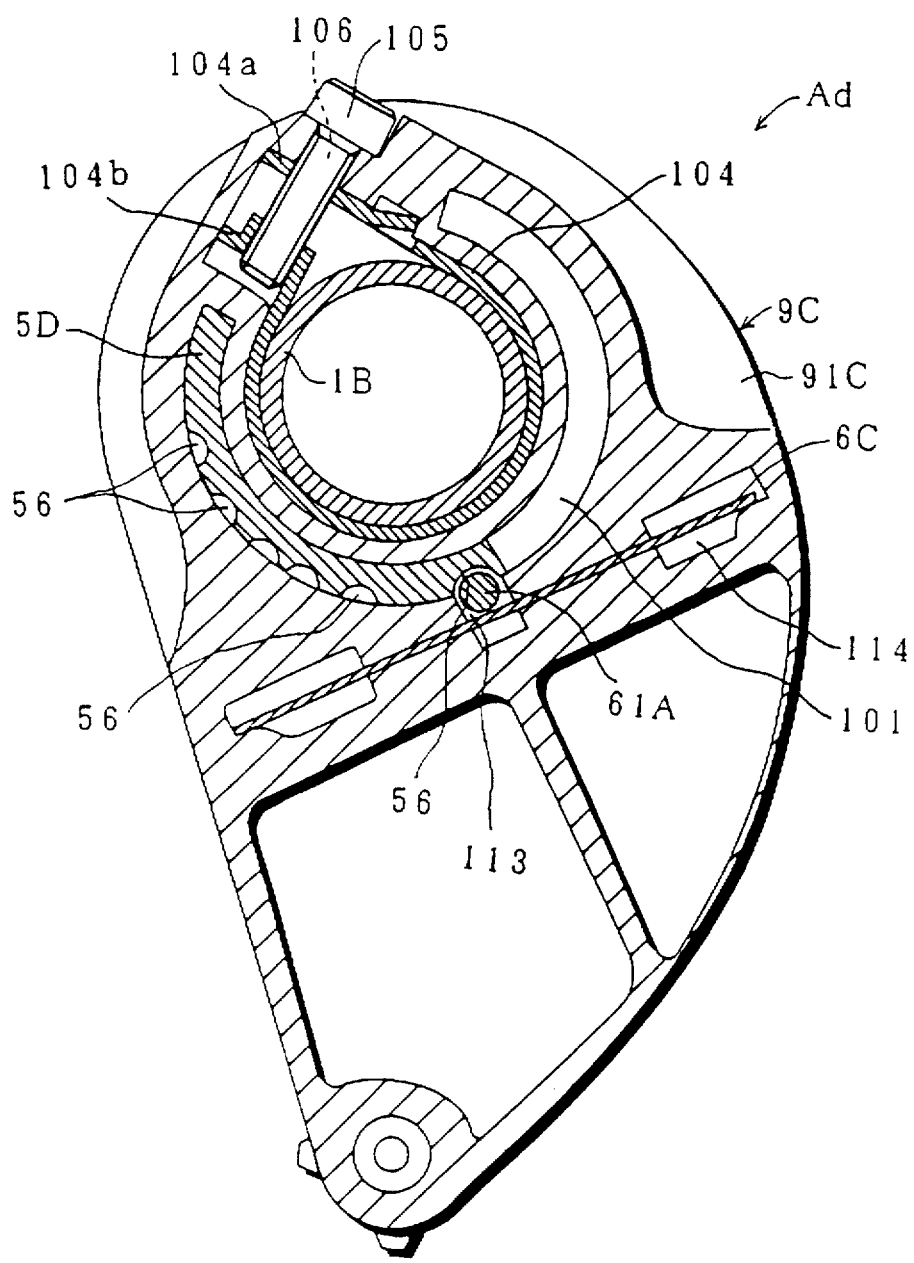
FIG. 34 is a sectional view taken along lines X10—X10 in FIG. 32.

The case body 91C has a tubular portion 102 with a through-hole 101 and a cable guide portion 115 for guiding the control cable C. The tubular portion 102 can be externally fitted on the handlebar 1B. The through-hole 101 has an inner end surface provided with a tightening band 104 externally covering the handlebar 1B, as shown in FIG. 34. Both ends 104a, 104b of the tightening band 104 allow passage of a bolt 105 which is inserted through a bore 106 of the case body 91C. The tightening band 104 can be fastened by rotating the bolt 105. The case body 91C is non-rotationally attached to the handlebar 1B by clamping the handlebar 1B with the use of the tightening band 104.

The operation member 2C is generally cylindrical having a through-hole 20C and a flange 21C and externally fitted around the tubular portion 102 of the case body 91C. The outer surface of the operation member 2C is provided with a plurality of projections 25 for preventing the operation grip 28 from rotating when the grip 28 is externally fitted on the operation member 2C.

The operation member 2C has a tubular portion 29C projecting on a side of the flange 21C, a plurality of constantly spaced projections 107 formed on an end of the outer surface of the tubular portion 29C, two mutually facing wall portions 108a, 108b and a bore 109 formed in the two wall portions 108a, 108b.

The first end 3a of the first link 3C is inserted in a clearance 110 formed between the ball portions 108a, 108b, and a shaft 31C is inserted through the through-hole 30a of the first link 3C and the bore 109. Thus, the first end 3a of the first link 3C is connected to the operation member 2C via the shaft 31C and is moved about the tubular portion 29C of the operation member 2C upon rotation of the operation member 2C.

Figure 36:
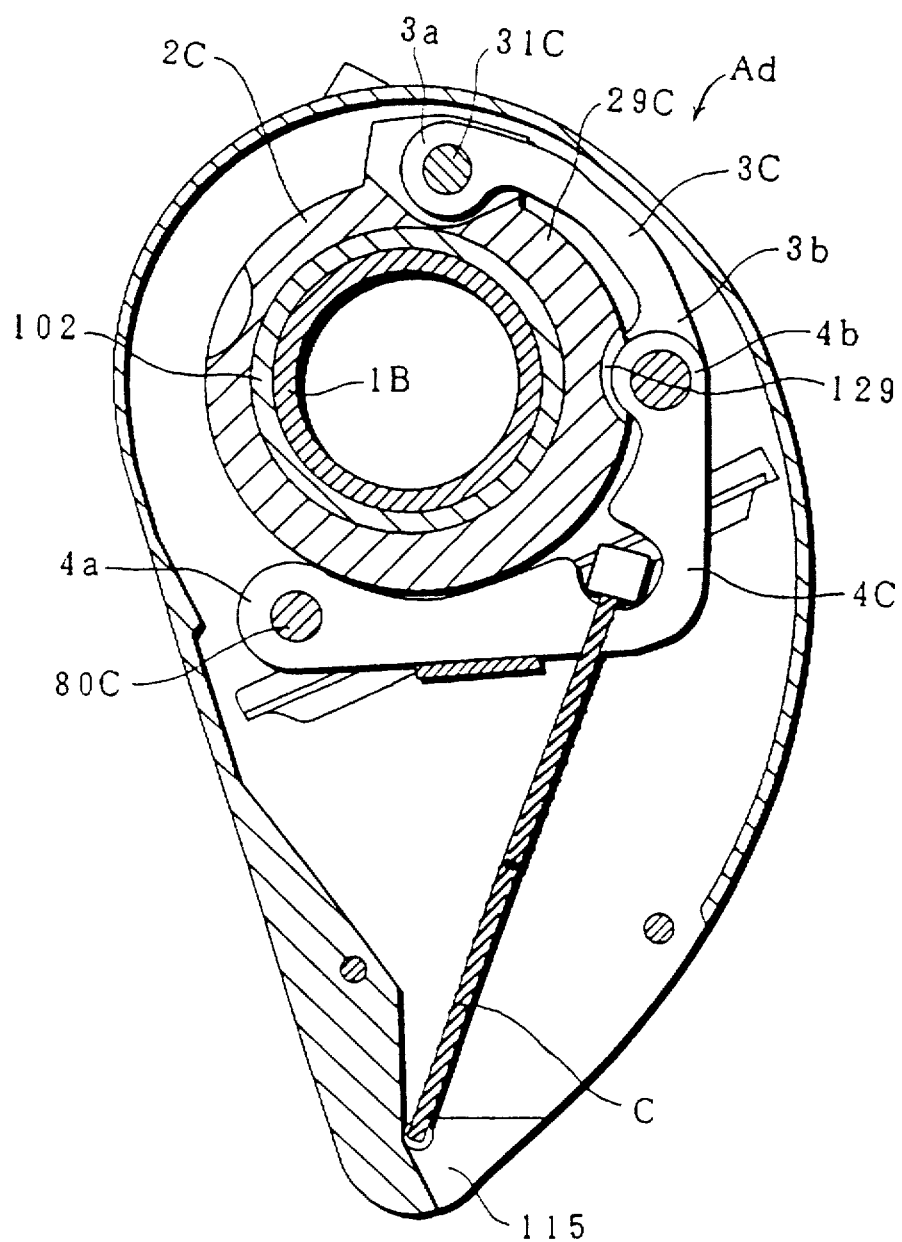
FIG. 36 is a sectional view illustrating the bicycle speed change operation assembly shown in FIG. 32 in operation.

The first link 3C has a curved configuration having a concave surface 30 whose radius of curvature is equal or generally equal to the radius of the tubular portion 29C of the operation member 2C. Therefore, upon rotation of the operation member 2C as shown in FIG. 36, the first link 3C can be brought into fitting engagement with the outer surface of the tubular portion 29C of the operation member 2C, thereby making it possible to prevent the first link 3C from bulging while providing an increased maximum rotational angle of the operation member 2C.

The second link 4C is constituted by two curved plates 47C, 47D connected to each other with a predetermined spacing therebetween. The control cable C is arranged between the two plates 47C, 47D and the nipple 14 of the control cable C is held in engagement with edges of the respective plates 47C, 47D. The portions engaging the nipple 14 in the plates 47C, 47D are recessed to prevent an undesirable positional shift of the nipple 14.

The fixed shaft 80C attached to the housing case 9C is inserted through the through-hole 40a at the first end 4a of the second link 4C. The second link 4C is vertically pivotal about the fixed shaft 80C. The second end 4b of the second link 4C and the second end 3b of the first link 3C are connected for relative pivotal movement. Similarly to the first link 3C, the second link 4C has a curved configuration having a concave surface 40C whose radius of curvature is equal or generally equal to the radius of the tubular portion 29C of the operation member 2C. Therefore, as shown in FIG. 36, when the second link 4C is brought into contact with the tubular portion 29C of the operation member 2C, the second link 4C can be fitted around the tubular portion 29C without interfering with the operation member 2C.

It is possible to bring the first link 3C and the second link 4C much closer to the operation member 2C by providing the tubular portion 29C of the operation member 2C with a recess 129 for accommodating the connected portion of the second end 3b of the first link 3C and the second end 4b of the second link 4C.

As shown in FIG. 35, the positioning ring 5D can be externally fitted around the tubular portion 102 of the housing case 9C. An edge of the positioning ring 5D is provided with an arcuate portion 57 to partially increase the width of the outer surface, and the arcuate portion is externally formed with a plurality of engaging recesses 56. The positioning ring 5D is internally formed at an end thereof with a plurality of recesses 112. The tubular portion 29C of the operation member 2C is inserted into the positioning ring 5D to bring the respective recesses 112 into engagement with the projections 107. The positioning ring 5D is not rotatable relatively to the operation member 2C due to the engagement between the recesses 112 and the projections 107 but rotatable around the tubular portion 102 with the operation member 2C.

Figure 37:
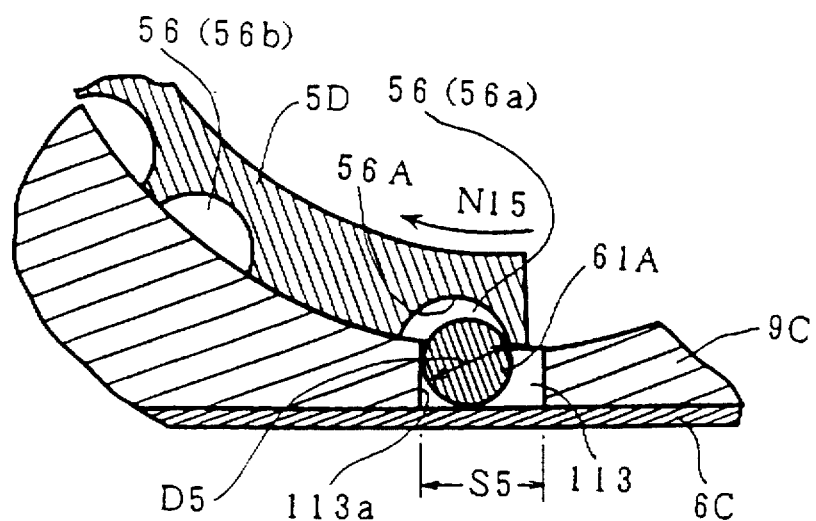
FIG. 37 is a sectional view illustrating principal parts of a positioning mechanism in operation.

As shown in FIG. 34, the roller 61A is retained in the housing case 9C so that the roller can be brought into facing relation with the engaging recesses 56. Specifically, the inner surface of the through-hole 101 of the housing case 9C is formed with a bore 113 for accommodating the roller 61A. As shown in FIG. 37, the width S5 of the bore 113 is larger than the outside diameter D5 of the roller 61A, so that in the bore 113 the roller 61A is movable circumferentially of of the positioning ring 5D within a range of a predetermined displacement.

Figure 38:
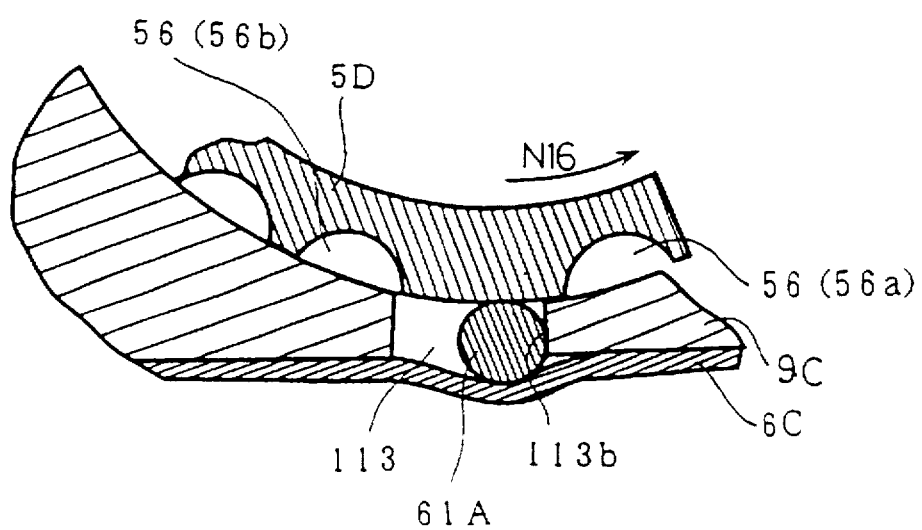
FIG. 38 is a sectional view showing principal parts of the positioning mechanism in operation.

The spring member 6C is fitted into a slit 114 formed in the housing case 9C. As shown in FIG. 38, when the roller 61A is not in engagement with the engaging recess 56, the spring member 6C is deformed and elastically urges the roller 61A toward the positioning ring 5D. On the other hand, as shown in FIG. 37, when the roller 61A is accommodated in the engaging recess 56, the spring member 6C does not elastically urge the roller 61A, preventing the roller 61A from coming into contact with the inner wall 56A of the engaging recess 56. Preferably, a suitable clearance S6 is formed between the roller 61A and the inner wall 56A of the engaging recess 56.

In the bicycle speed change operation assembly Ad having the above arrangement, upon rotation of the operation member 2C in the direction of arrow N14, starting from the state shown in FIG. 33, the second link 4C pivots vertically about the fixed shaft 80C with movement of the first link 3C as shown in FIG. 36, thereby pulling the control cable C. Like the already-described bicycle speed change operation assemblies A and Aa–Ac, the bicycle speed change operation assembly Ad also includes a link mechanism as a force-magnifying mechanism constituted by the first link 3C and the second link 4C. Thus, a small displacement of the control cable C is obtainable by rotating the operation member 2C by a large angle. Further, the angular operation torque of the operation member 2C can be reduced. Since the control cable C is pulled directly by the second link 4C from the cable guide portion 115, there is no large frictional force generated on the control cable C. Thus, the operation of the operation member 2C is facilitated when causing the rear derailleur to perform speed change operations.

The control cable C can be pulled in a straight path by the second link 4C, similarly to the already-described bicycle speed change operation assemblies Ab, Ac, thereby requiring no need to provide an additional guide member for the control cable C.

As the operation member 2C is sequentially rotated, the engaging recesses 56 of the positioning ring 5D rotates accordingly, and the roller 61A will come into releasable engagement with one of the respective recesses 56 after another. Thus, the engagement between the roller 61A and the respective engaging recesses 56 can retain the positioning ring 5D and the operation member 2C at a predetermined rotational angular position, thereby retaining the rear derailleur for at an intended speed level.

With the bicycle speed change operation assembly Ad again, an overshift can be performed as follows.

Specifically, as shown in FIG. 37 for example, in an instance where the roller 61A is held in engagement with an engaging recess 56 (56a), when the cyclist keeps his hand off the operation grip 28, the rear derailleur spring force acting on the control cable C tends to rotate the positioning ring 5D and the operation member 2C in the direction of arrow N15. Thus, in a normal state where no speed change is performed, the roller 61A is in a stabilized state, being urged by the engaging recess 56 (56a) to come into contact with an end wall 113a of the bore 113.

Figure 39A:
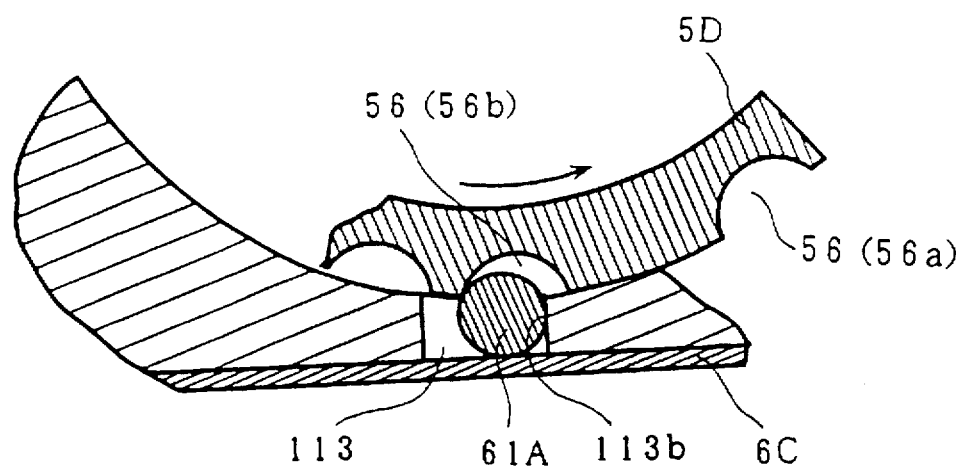
FIGS. 39a–39b are sectional views showing principal parts of the positioning mechanism in operation.

Then, as shown in FIG. 38, the roller 61A leaves the engaging recess 56 (56a) upon rotation of the operation member 2C in the direction of arrow 16 and comes into engagement with the next engaging recess 56 (56b), as shown in FIG. 39a. At this time, the roller 61A is movable within the bore 113 until coming into contact with the other end wall 113b of the bore 113. Thus, the displacement of the roller 61A within the bore 113 allows the operation member 2C to be additionally rotated more than needed for the actual angular rotation, thereby pulling the control cable C in an amount greater than needed for the speed change operation of the rear derailleur.

Figure 39B:
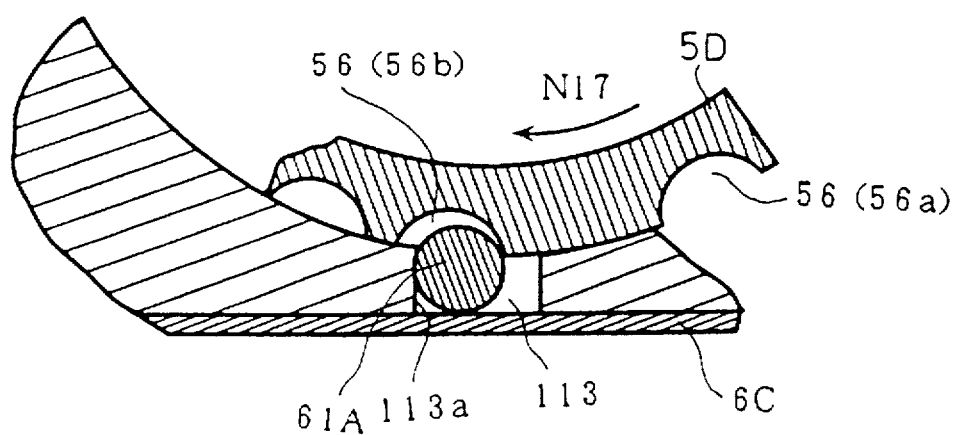

Then, when the cyclist removes his hand off the operation grip 28, the rear derailleur spring force acting on the control cable C rotates the positioning ring 5D backward in the direction of arrow 17 as shown in FIG. 39b, until the roller 61A comes into contact with a wall 113a of the bore 113, and the positioning ring stabilizes thereafter. During the backward rotation of the positioning ring 5D, the inner wall 56A of the engaging recess 56 (56b) and the roller 61A are not pressed against each other, thereby preventing the roller 61A from giving a large resisting force to the positioning ring 5D in the backward rotation. Thus, it is possible to cause the positioning ring 5D and the operation member 2C to perform a returning movement smoothly and easily.

The following means is also applicable for causing the bicycle speed change operation assembly Ad to perform an overshift function in place of the means where the roller 61A is rendered movable within the bore 113.

Figure 40A:
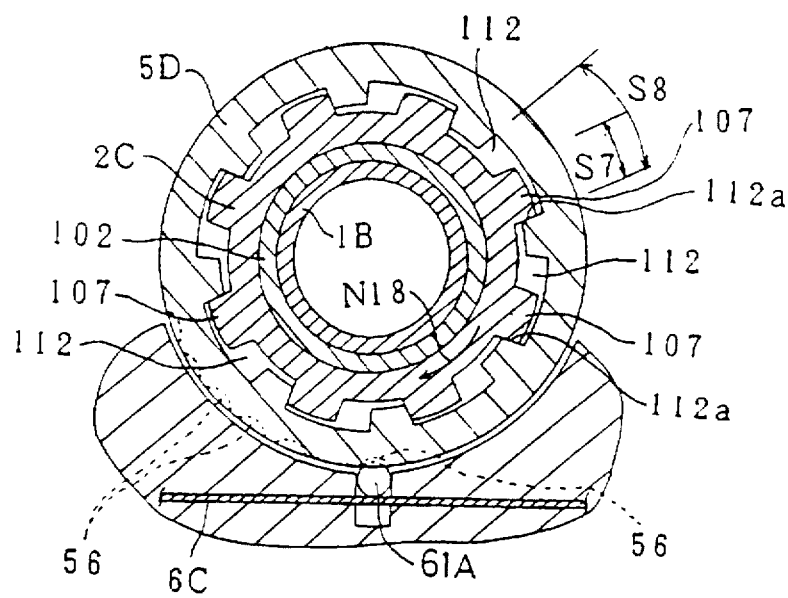
FIGS. 40a–40c are sectional views showing principal parts of a positioning mechanism in operation.

Specifically, as shown in FIG. 40a, for mutual engagement between the projections 107 of the operation member 2C and the recesses 112 of the positioning ring 5D, the width S7 of the projection 107 may be rendered smaller than the width S8 of the recess 112 for example, so that the positioning plate 5D can move relatively to the operation member 2C within a predetermined angular range.

With such an arrangement, in a normal state where one of the engaging recesses 56 is held in contact with the roller 61A and no speed change operation is performed, the projection 107 is held in contact with the wall 112a of the recess 112 for prevention of the rotation of the operation member 2C due to the rear derailleur spring force tending to rotate the operation member 2C in the direction of arrow N18.

Figure 40B:
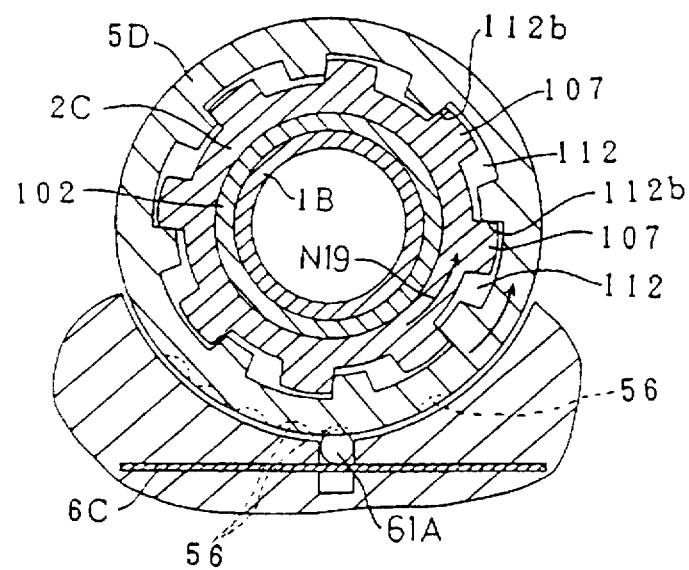

Then, when the operation member 2C is rotated in the direction of arrow N19 as shown in FIG. 40b, the projection 107 comes into contact with the other wall 112b of the recess 112, thereby enabling additional rotation of the positioning member 2C in the direction of arrow 19 more than the rotational angle of the positioning ring 5D. Thus, the control cable C can be additionally pulled by an amount larger than necessary for the rear derailleur speed change operation.

Figure 40C:
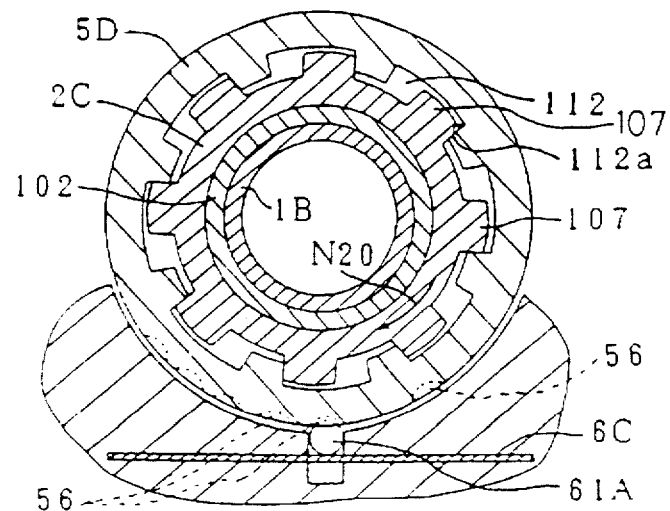
Figure 41A:
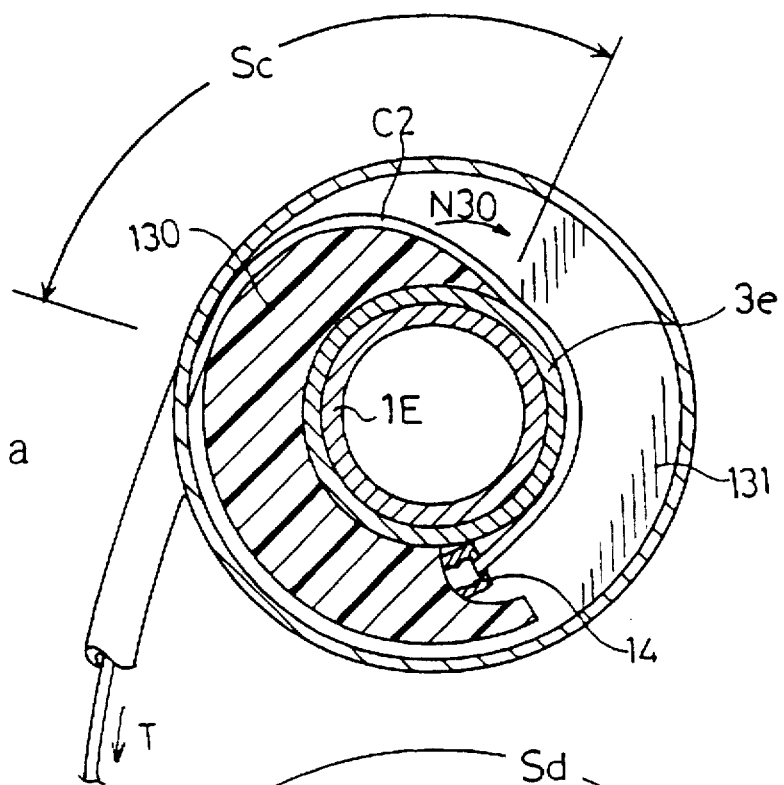
Figure 41B:
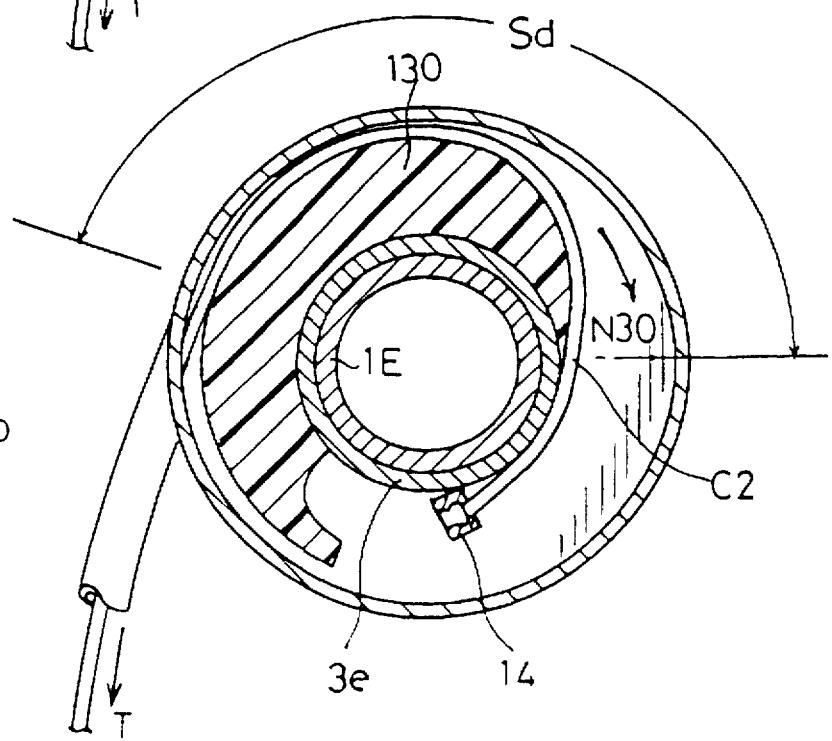
FIG. 41b illustrates the same in operation.

Thereafter, when the cyclist removes his hand off the operation grip 28, the rear derailleur spring force rotates the operation member 2C backward relatively to the positioning ring 5D in the direction of arrow N20 as shown in FIG. 40c until the projection 107 comes into contact with the wall 12a of the recess 112. Thus, the operation member 2C is settled at the actually corresponding angular position for the speed change operation.

Similarly to the already-described bicycle speed change operation assemblies A, Ab, in the bicycle speed change operation assembly Ad, it is possible to arrange that the operation member 2C need be rotated by a larger amount to pull a constant length of the control cable C, as the operation member 2C is rotated further into the direction of arrow N14 as shown in FIG. 33. Therefore, even when the rear derailleur spring force becomes larger as the rear derailleur is operated for a reduced speed, the magnifying ratio of the rotational torque of the operation member 2B can be increased accordingly, thereby providing a total equalization for the operation torque needed for rotational operation of the operation member 2B.

Though the bicycle speed change operation assembly Ad described above is designed for a rear derailleur, the same may be designed for a front derailleur. When arranging the assembly for the front derailleur, it is necessary to modify the specifications of the speed change operation assembly so that the engaging recess 56 of the positioning ring 5D is made suitable for the front derailleur. Such a modification can be easily performed by replacing the positioning ring 5D with another positioning ring.

In the embodiments described above, reference is made to examples of a speed change operation assembly used for the speed change operation of the rear derailleur for six-speed rear gears and the front derailleur for three-speed front gears. However, apparently, the present invention is not limited to these but may be embodied as a speed change operation assembly applicable to speed change devices which are of various kinds or provide a different number of speed levels.

Further, though in the above embodiments the operation member is of a grip-type and mounted around the handlebar of a bicycle for rotational movement, the present invention is not limited to this, either. According to the present invention, the operation member may be mounted on a portion other than the handlebar.

Specific arrangements for the respective elements of the bicycle speed change operation assembly according to the present invention may be modified in various ways.

INDUSTRIAL APPLICABILITY

The bicycle speed change operation assemblies according to the present invention are applicable in general to bicycles having a speed change device such as a rear derailleur, a front derailleur and the like.

I claim:

1. A bicycle speed change operation assembly which has an operation member rotatable around an axis of a handlebar of a bicycle, the assembly being connected to a speed change device of the bicycle via a control cable, the assembly including a first link and a second link, an end of the first link and an end of the second link being connected to each other for relative pivotal movement about a common pivotal axis, another end of the first link being supported so as to be moved circumferentially of the operation member upon rotation thereof, the first link having a concave surface for partially surrounding the handlebar, another end of the second link being supported at a fixed point for pivotal movement about a stationary pivotal axis, the common pivotal axis and the stationary pivotal axis extending in parallel to said axis of the handlebar, an end of the control cable being connected to the second link at an intermediate portion between the common pivotal axis and the stationary pivotal axis.

2. The bicycle speed change operation assembly according to claim 1, wherein the operation member is generally cylindrical.

3. The bicycle speed change operation assembly according to claim 1, wherein said another end of the first link is connected to the operation member.

4. The bicycle speed change operation assembly according to claim 1, wherein said another end of the first link is connected to a member which rotates with the operation member.

5. The bicycle speed change operation assembly according to claim 2, wherein said another end of the second link is connected to a fixed shaft supported by a member which is fixed to the handlebar of the bicycle.

6. The bicycle speed change operation assembly according to claim 1, wherein the second link has a concave surface for partially surrounding the handlebar.

7. The bicycle speed change operation assembly according to claim 2, wherein the second link is arranged to be vertically pivotable below the handlebar of the bicycle.

8. The bicycle speed change operation assembly according to claim 1, further comprising a positioning mechanism which is capable of holding the operation member at a plurality of predetermined rotational angular positions.

9. The bicycle speed change operation assembly according to claim 8, wherein the positioning mechanism comprises an engaging member movable with the operation member, a positioning plate having a plurality of engaging bores, and a spring member for elastically urging the engaging member toward the positioning plate to bring the engaging member into releasable engagement with each of the plurality of engaging bores.

10. The bicycle speed change operation assembly according to claim 9, wherein the positioning plate is rotatable by a predetermined angle in a rotating direction of the engaging member to enable an overshift of the speed change device of the bicycle.

11. The bicycle speed change operation assembly according to claim 8, wherein the positioning mechanism comprises a plurality of engaging recesses rotatable with the operation member, an engaging member arranged to face the plurality of engaging recesses, and a spring member for elastically urging the engaging member in facing relation to the plurality of engaging recesses to bring the engaging member into releasable engagement with each of the plurality of engaging recesses.

12. The bicycle speed change operation assembly according to claim 11, wherein the engaging member is reciprocally movable within a predetermined range in a rotating direction of the plurality of engaging recesses to enable an overshift of the speed change device of the bicycle.

13. The bicycle speed change operation assembly according to claim 11, wherein the engaging member is spaced from an inner wall of any one of the plurality of engaging recesses when the engaging member comes into engagement with said any one of the plurality of engaging recesses.

14. The bicycle speed change operation assembly according to claim 11, further comprising a positioning ring which releasably engages the operation member, the plurality of engaging recesses being formed in the positioning ring.

15. The bicycle speed change operation assembly according to claim 14, wherein the positioning ring is rotatable within a predetermined angular range relative to the operation member to enable an overshift of the speed change device of the bicycle.

16. The bicycle speed change operation assembly according to claim 1, further comprising a cable supporting guide pivotable with the second link about a fixed shaft which is concentric with a pivot center of the second link, the cable supporting guide having a guide surface for supporting the control cable in contact therewith, the guide surface being configured in an arcuate form which is concentric with a pivot center of the cable supporting guide.

17. The bicycle speed change operation assembly according to claim 1, wherein said end of the control cable is connected to the second link so that said end of the control cable is pulled along a straight path from an upper portion of a cable guide when the second link pivots.

18. The bicycle speed change operation assembly according to claim 1, wherein the first link and the second link are rigid.

* * * * *